Nov. 16, 1937.  A. H. SCHMIDTKE  2,099,411
MACHINE FOR MAKING AND ATTACHING WIRE BASKET HANDLES OR THE LIKE
Filed April 11, 1936   16 Sheets-Sheet 1
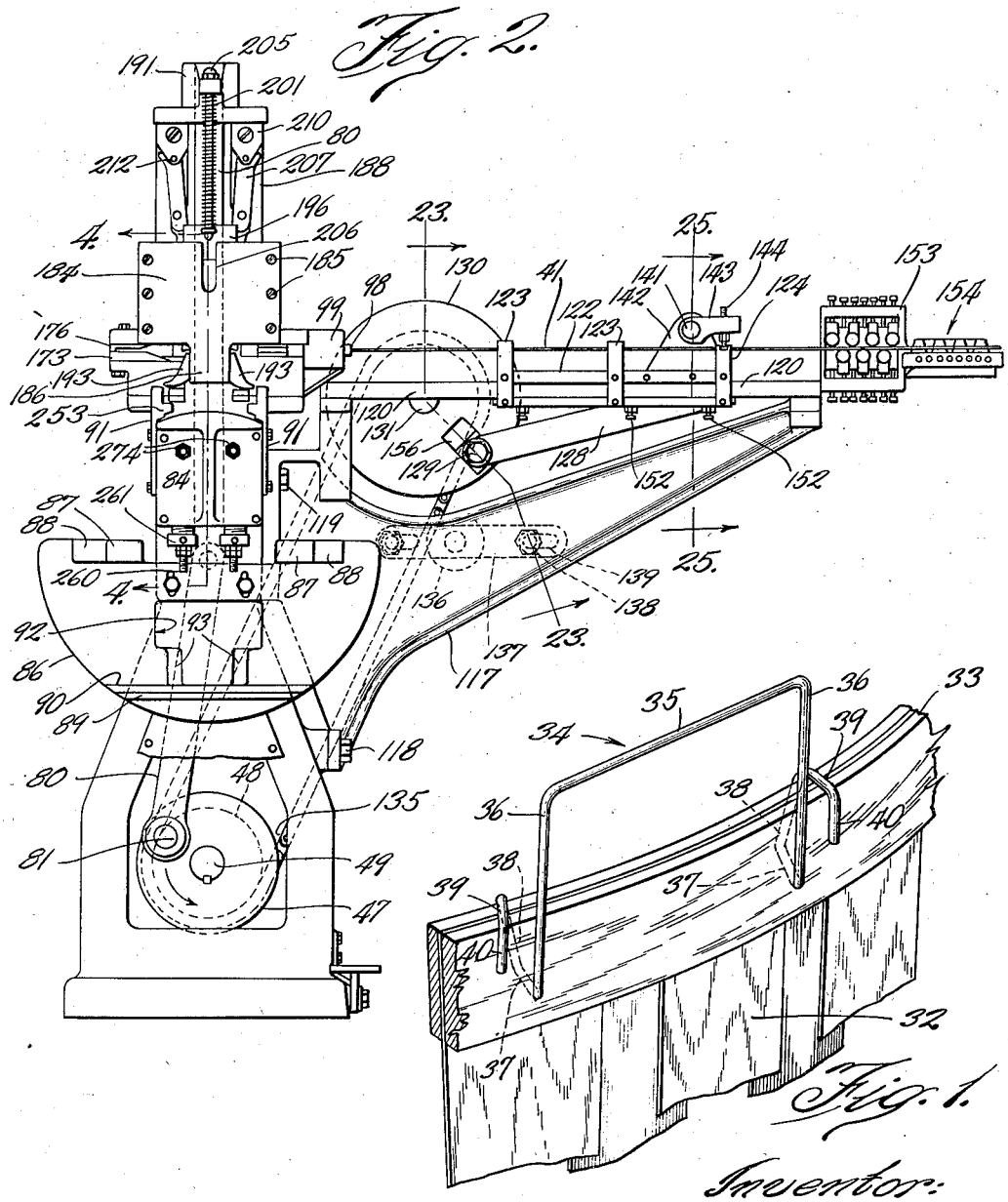
Inventor:
Albert H. Schmidtke
By Eugene M. Giles  Atty.

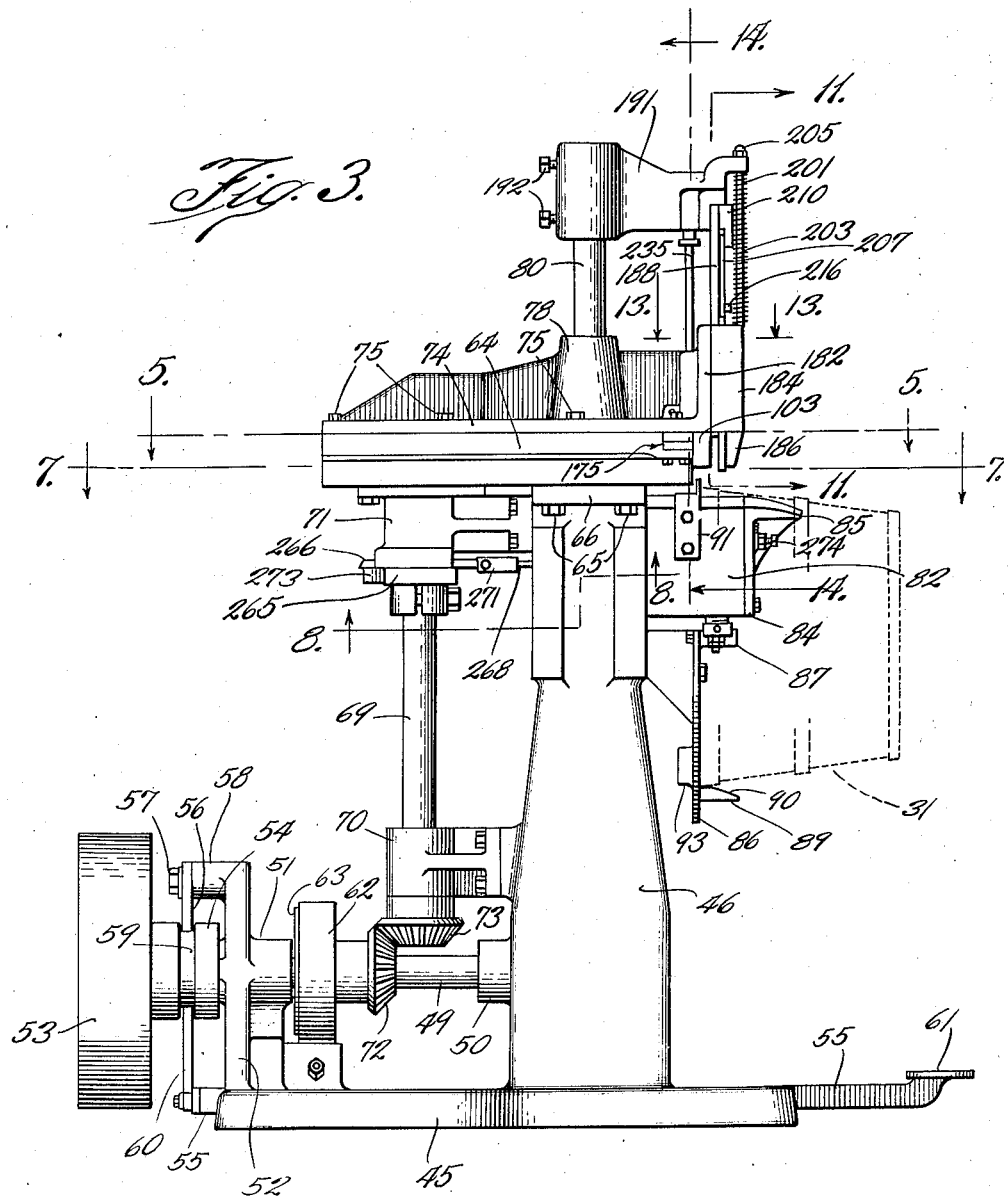

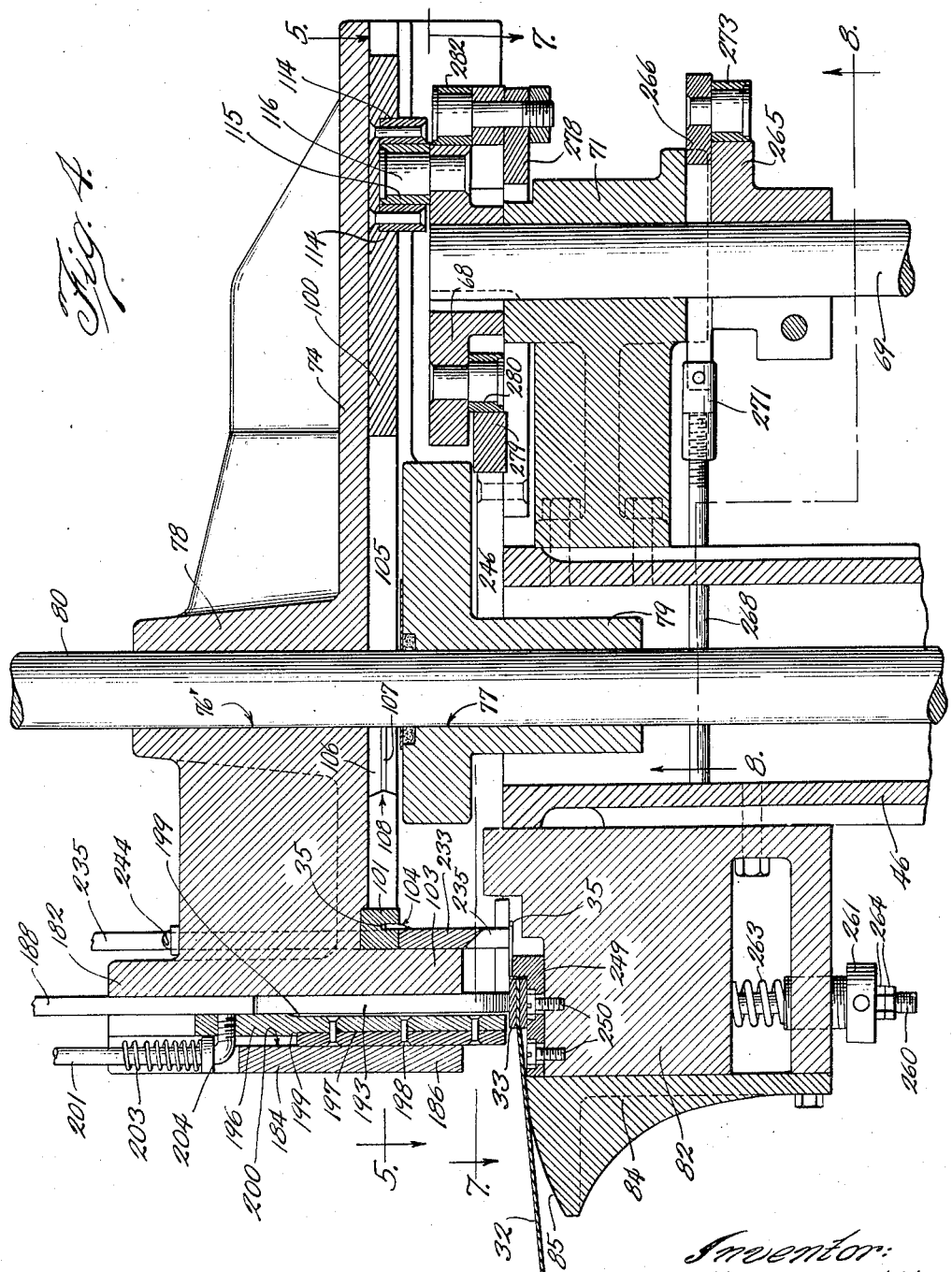

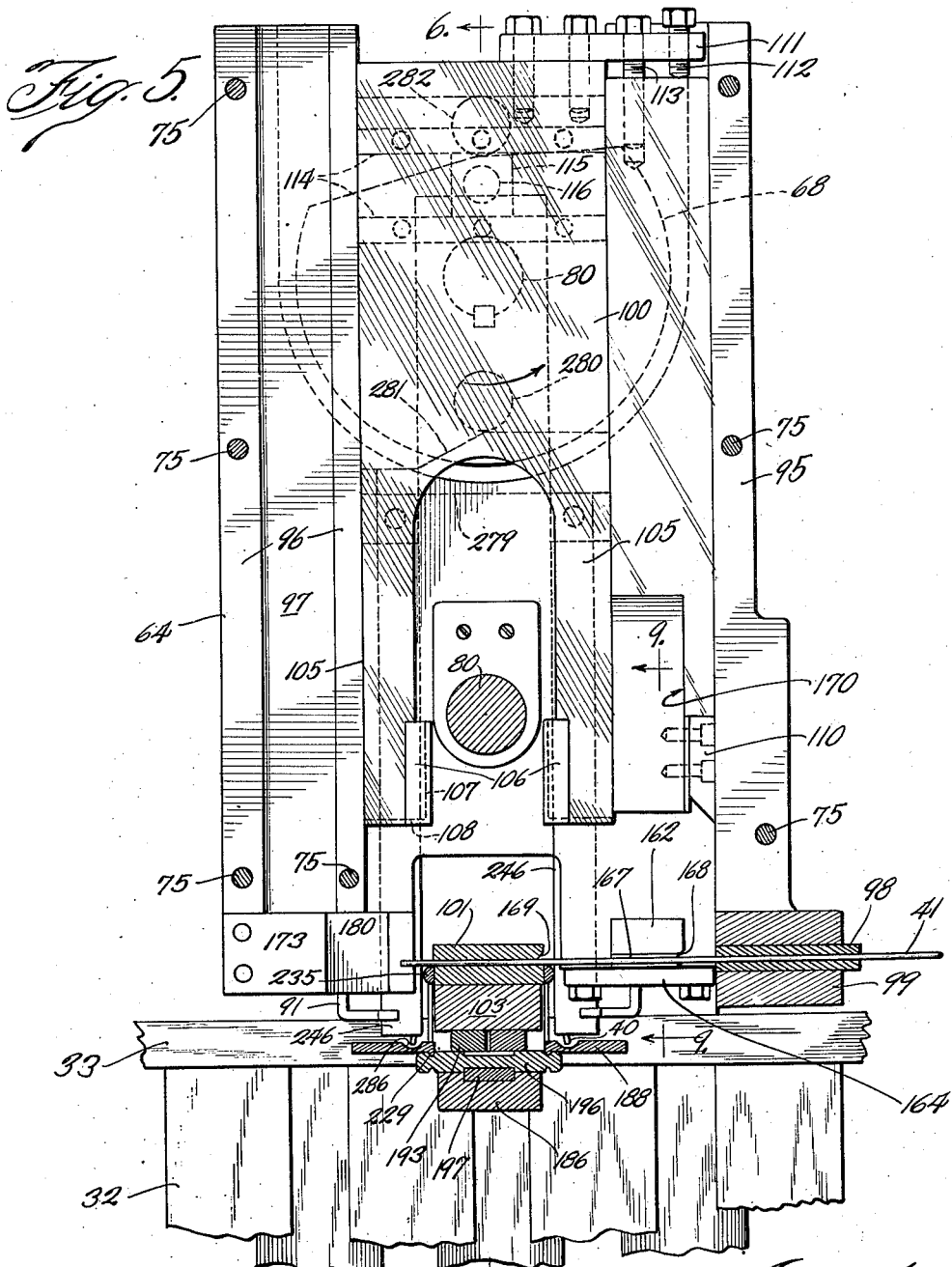

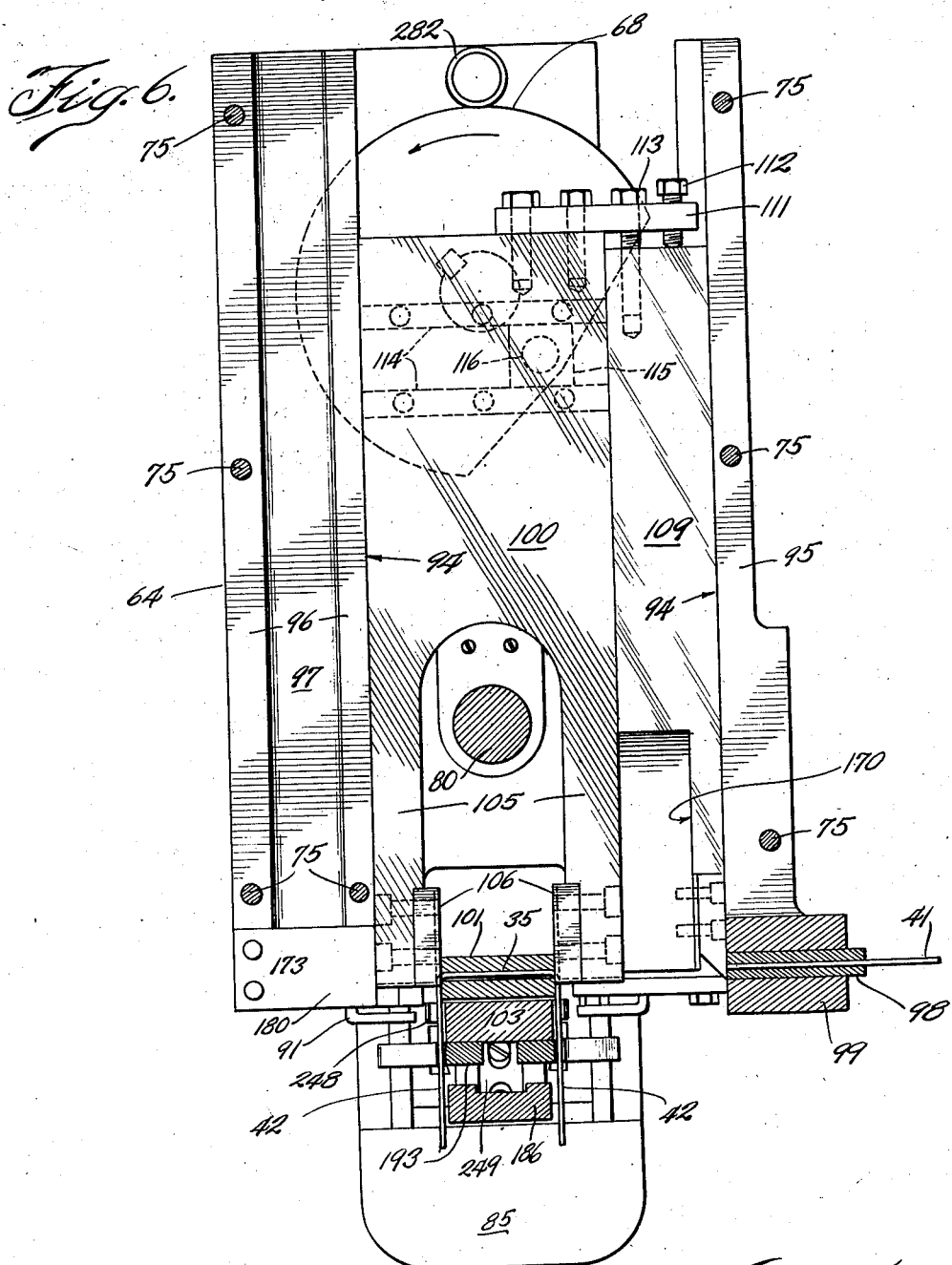

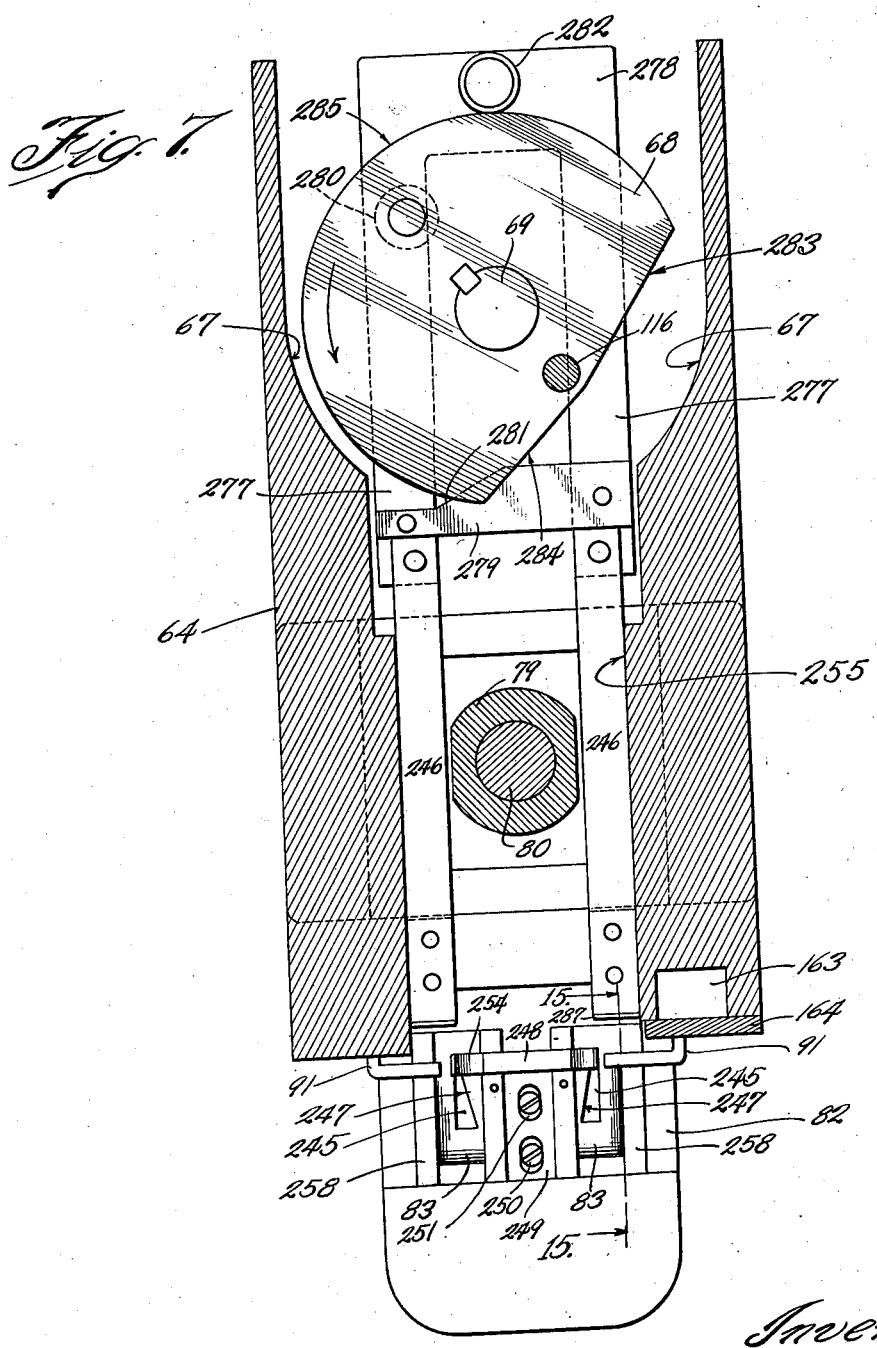

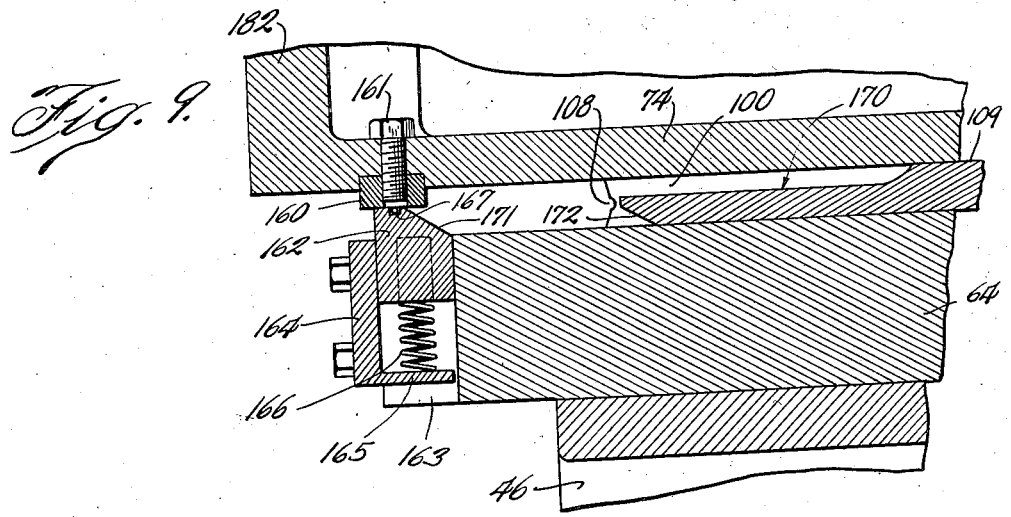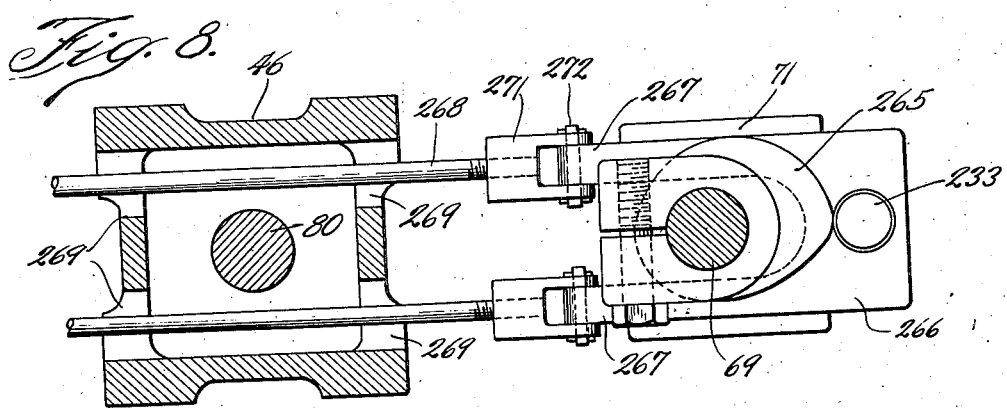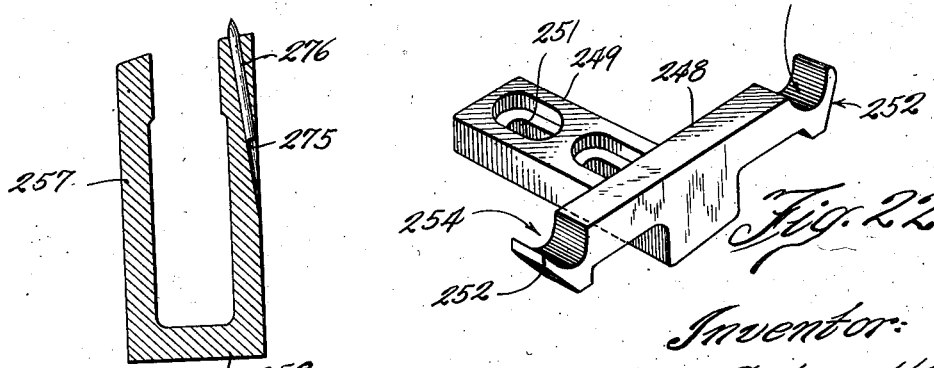

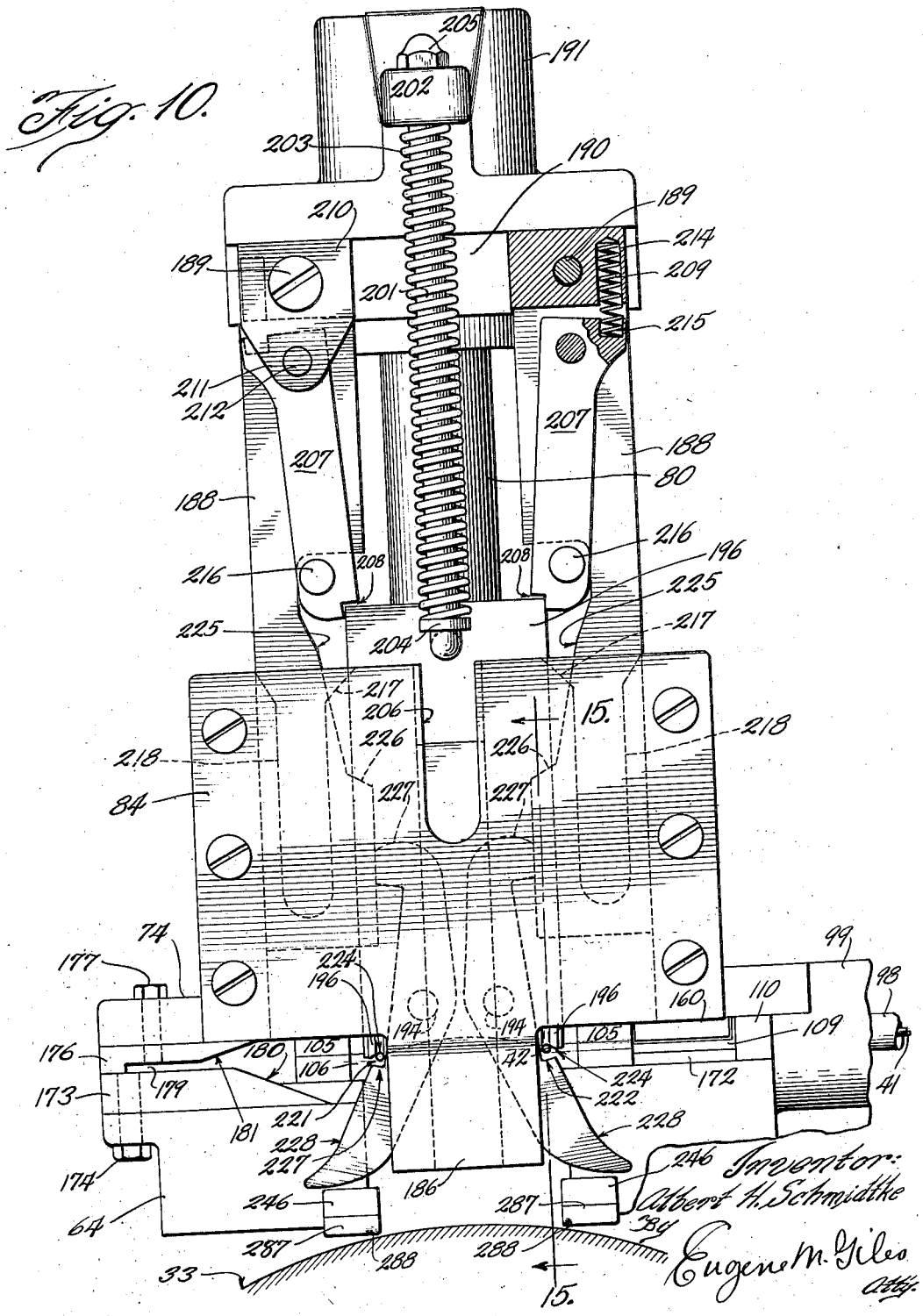

Nov. 16, 1937.  A. H. SCHMIDTKE  2,099,411
MACHINE FOR MAKING AND ATTACHING WIRE BASKET HANDLES OR THE LIKE
Filed April 11, 1936   16 Sheets-Sheet 9

Inventor:
Albert H. Schmidtke
By Eugene M. Giles
Atty.

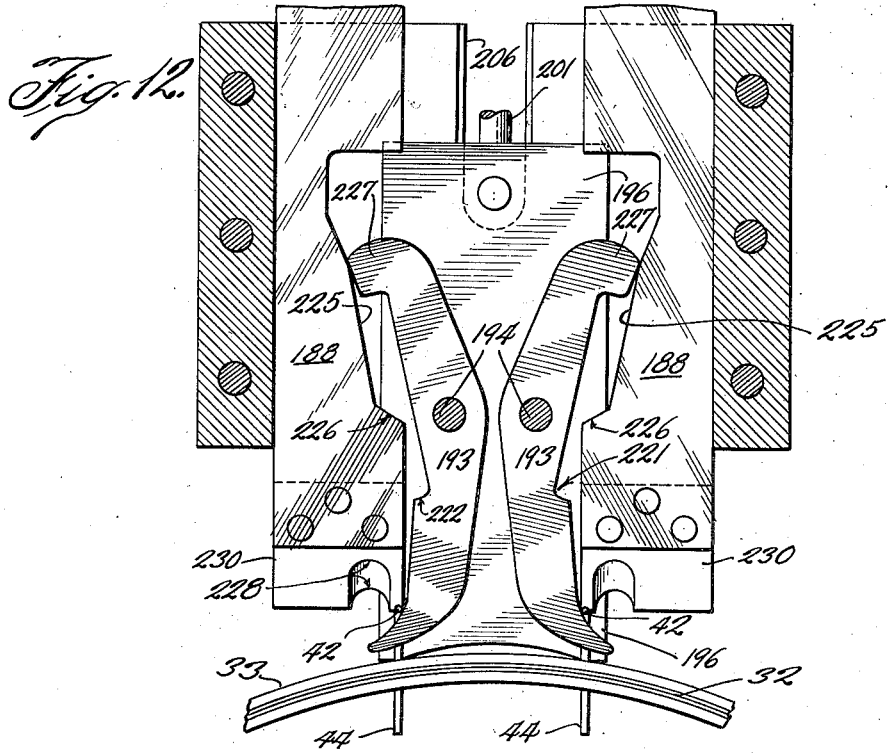
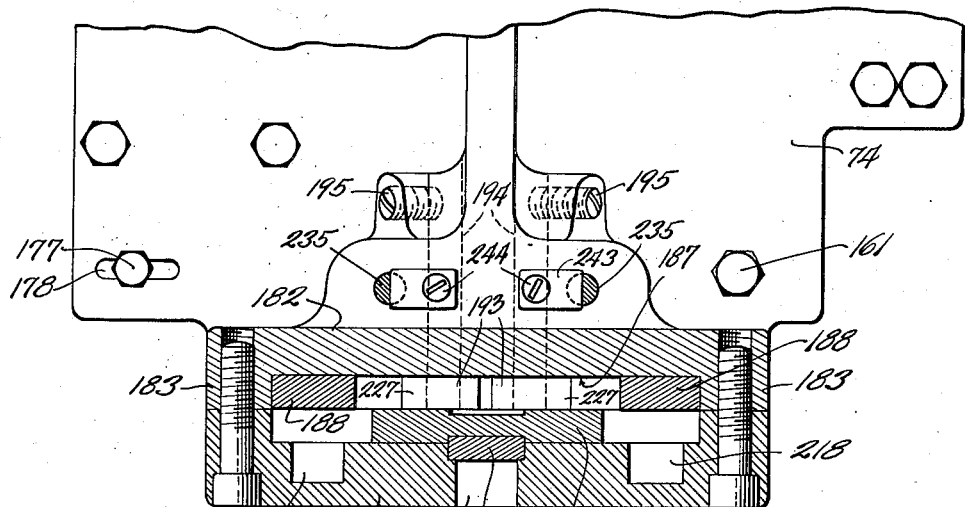

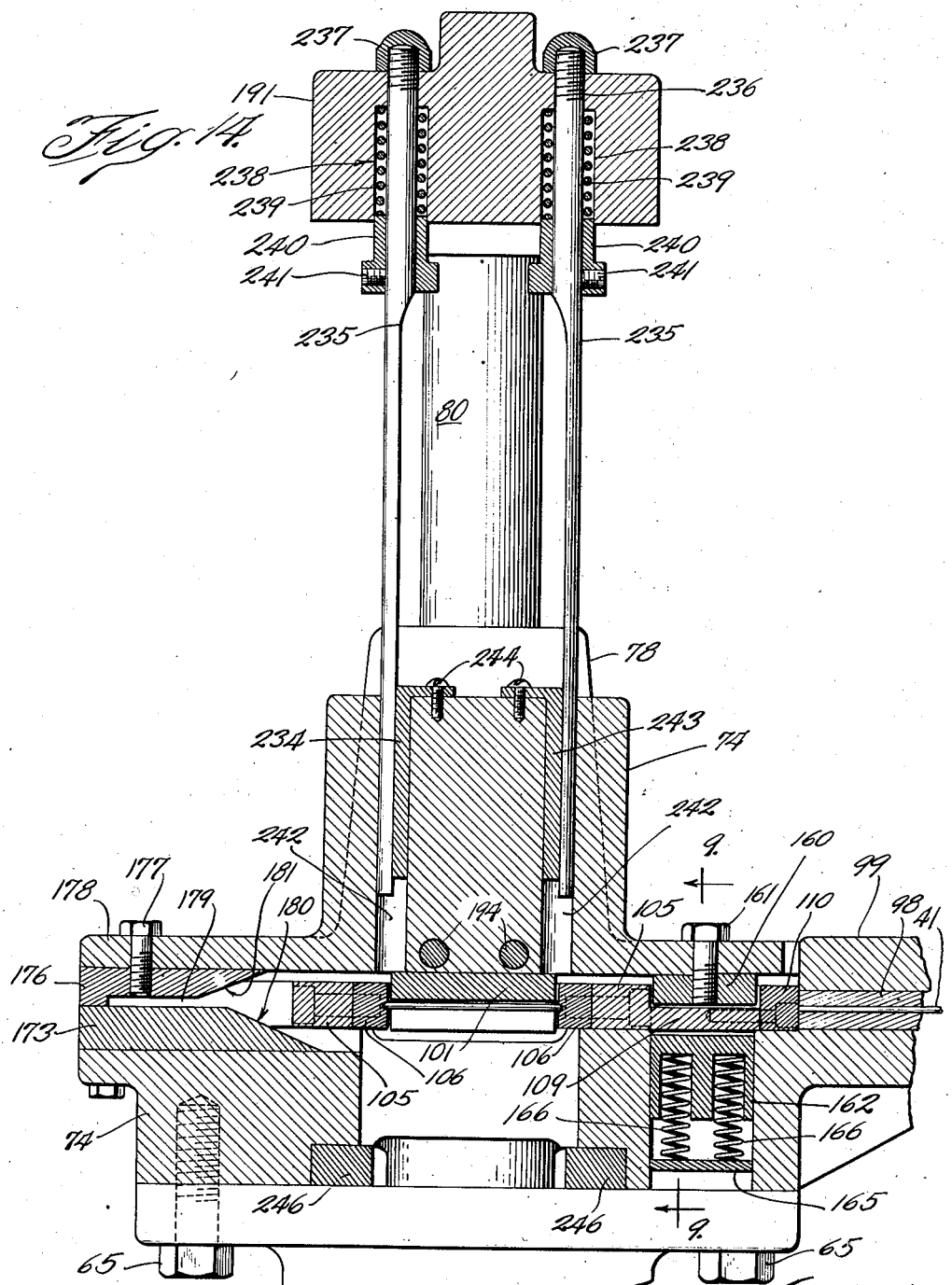

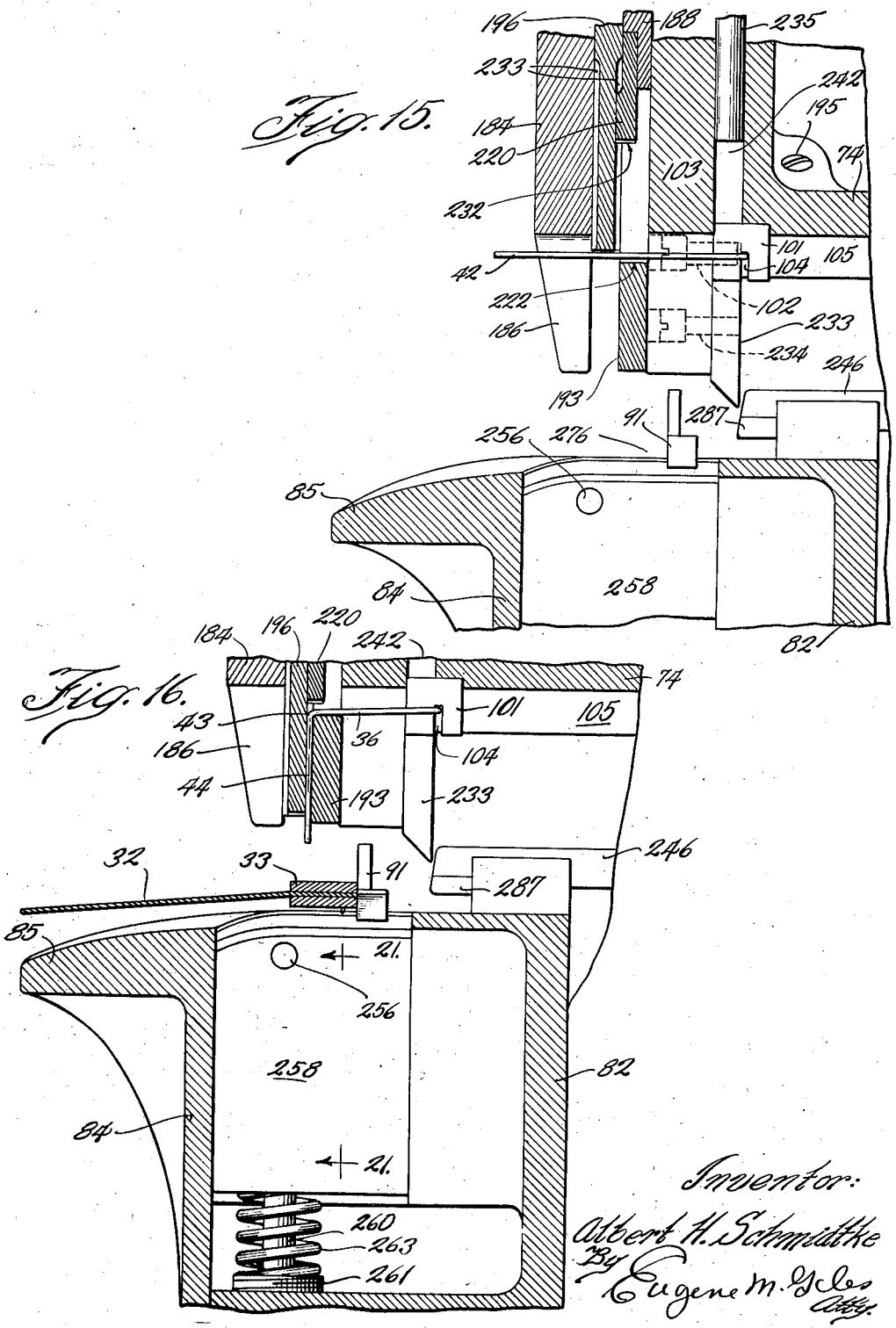

Nov. 16, 1937.   A. H. SCHMIDTKE   2,099,411
MACHINE FOR MAKING AND ATTACHING WIRE BASKET HANDLES OR THE LIKE
Filed April 11, 1936   16 Sheets-Sheet 13
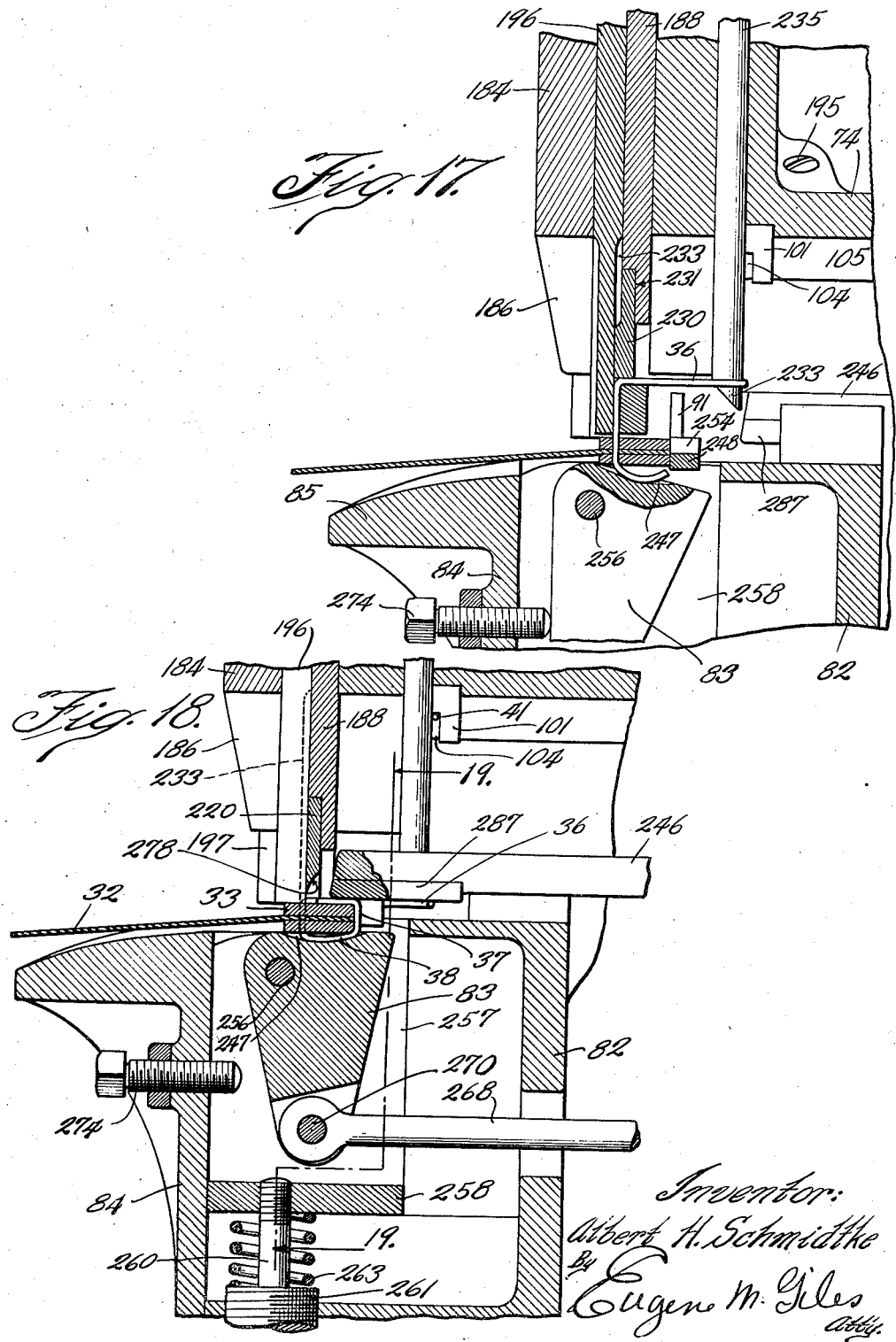

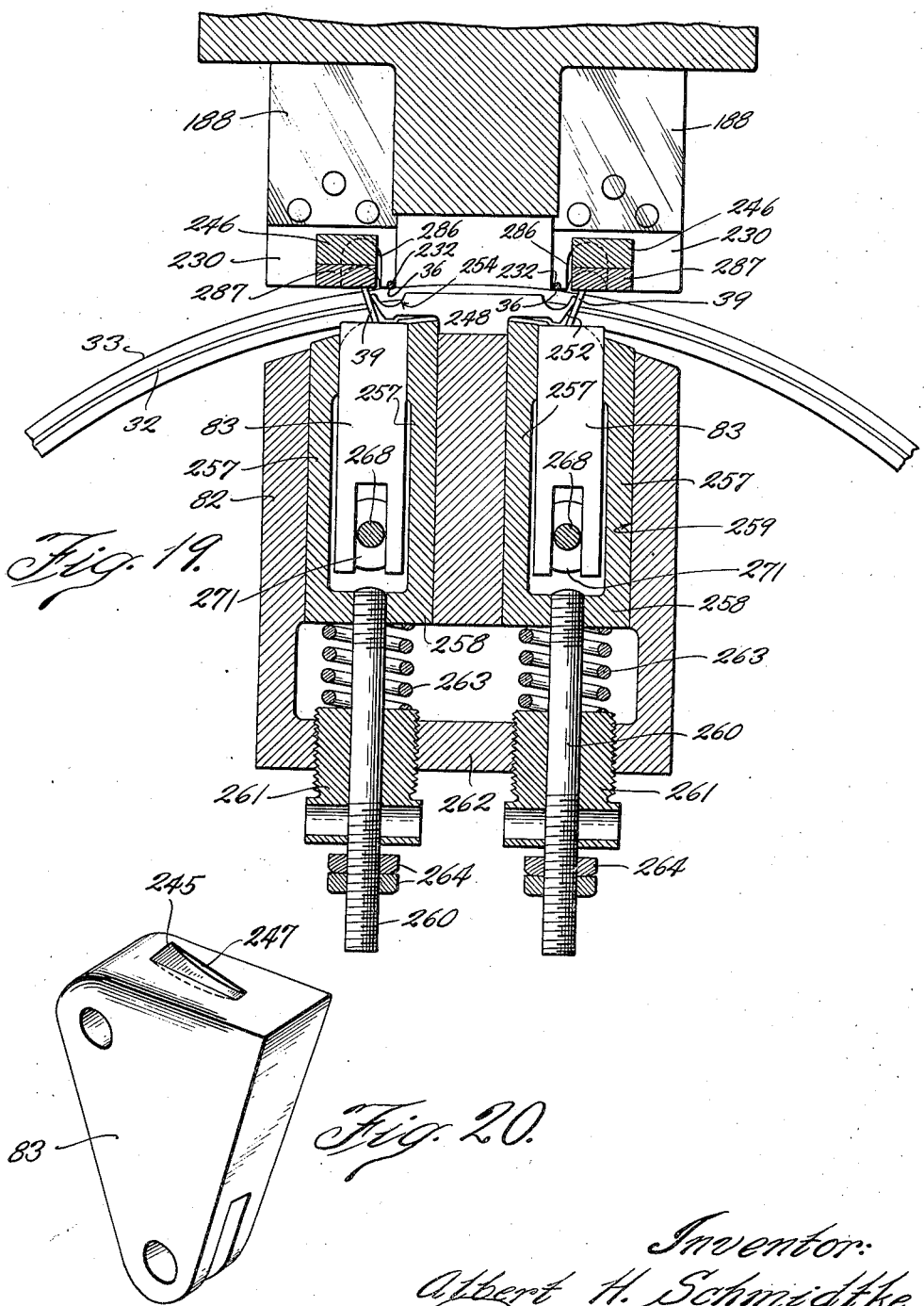

Nov. 16, 1937.   A. H. SCHMIDTKE   2,099,411
MACHINE FOR MAKING AND ATTACHING WIRE BASKET HANDLES OR THE LIKE
Filed April 11, 1936   16 Sheets-Sheet 15

Inventor:
Albert H. Schmidtke
By Eugene M. Giles Atty.

Nov. 16, 1937. A. H. SCHMIDTKE 2,099,411
MACHINE FOR MAKING AND ATTACHING WIRE BASKET HANDLES OR THE LIKE
Filed April 11, 1936 16 Sheets-Sheet 16
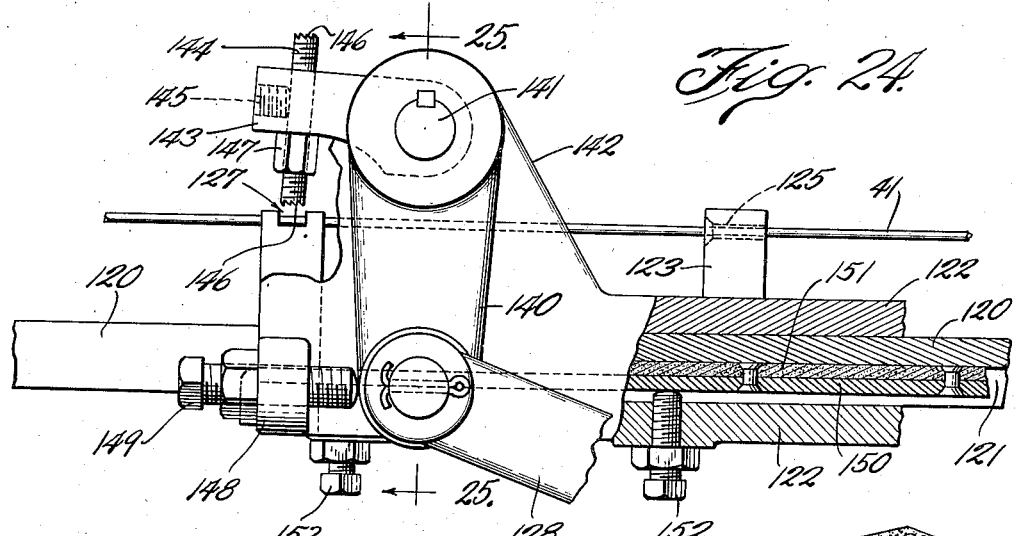
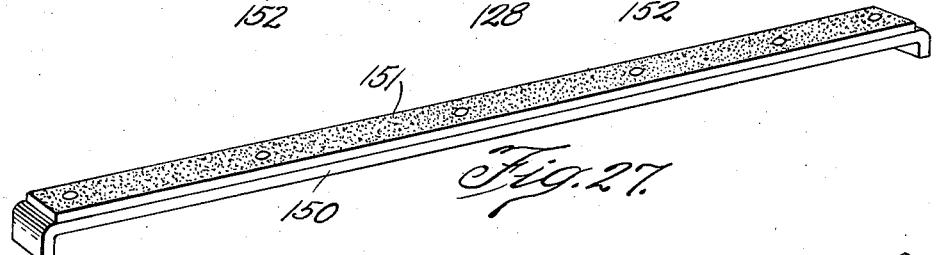
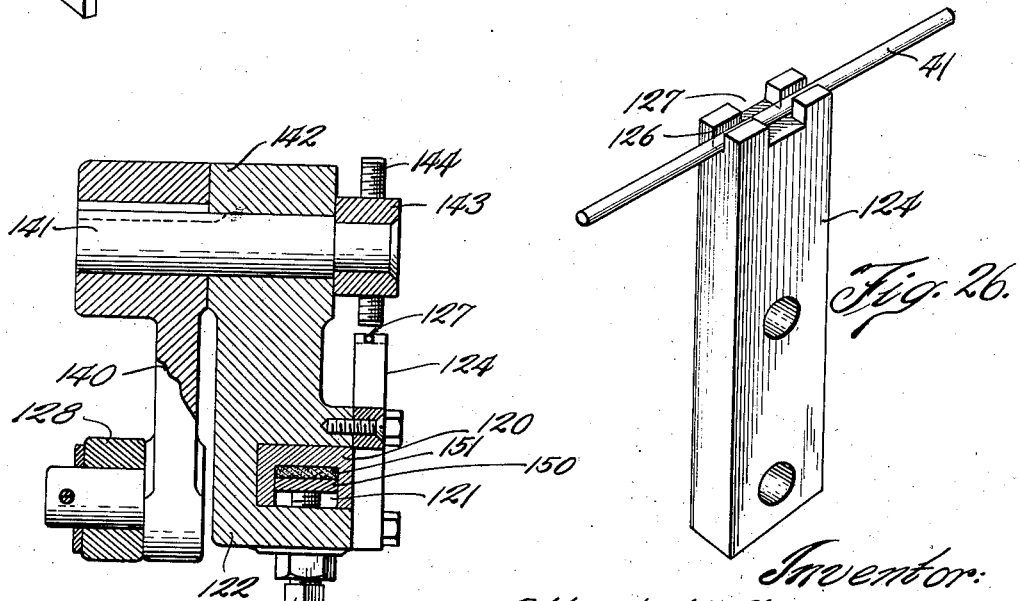
Inventor:
Albert H. Schmidtke
By Eugene M. Giles
Atty.

Patented Nov. 16, 1937

2,099,411

UNITED STATES PATENT OFFICE 2,099,411

MACHINE FOR MAKING AND ATTACHING WIRE BASKET HANDLES OR THE LIKE

Albert H. Schmidtke, St. Joseph, Mich., assignor to St. Joseph Iron Works, St. Joseph, Mich., a corporation of Michigan Application April 11, 1936, Serial No. 73,887

16 Claims. (Cl. 140—93)

My invention relates to machines for making and attaching wire basket handles or the like and has reference more particularly to facilities for forming such wire devices with angular attaching ends and for driving and clinching such ends.

The principal objects of my invention are to provide an improved machine for making and attaching wire basket handles or other similar devices with angular attaching ends; to simplify and facilitate the formation and attachment of such wire devices or handles and insure proper and satisfactory insertion of the angular attaching ends; to provide improved clinching facilities for individually accommodating variations in the thickness of the material through which the ends of the wire device are inserted; and in general to provide a machine which will form and attach wire handles and similar wire devices in a better and more satisfactory manner than heretofore,— these and other objects being accomplished with the structure shown in the accompanying drawings in which,—

Fig. 1 is a perspective view of a fragmentary portion of a basket showing a handle as made and applied to the basket with the present machine;

Fig. 2 is a front view of the machine for making and attaching the handle of Fig. 1;

Fig. 3 is a side view of the machine as it appears from the left side of Fig. 2;

Fig. 4 is an enlarged vertical sectional view of the handle forming and attaching mechanism taken on the line 4—4 of Fig. 2;

Figure 11:
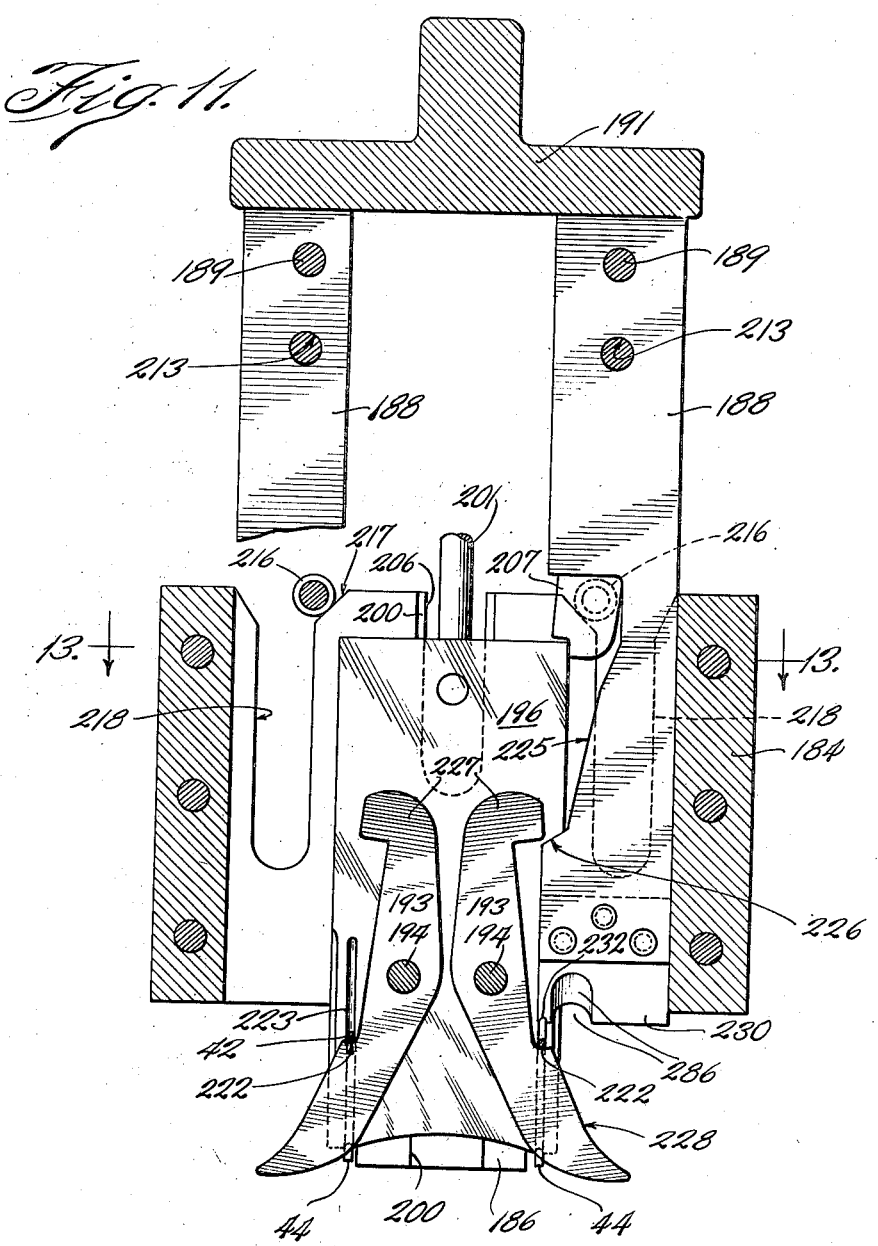
Figure 23:
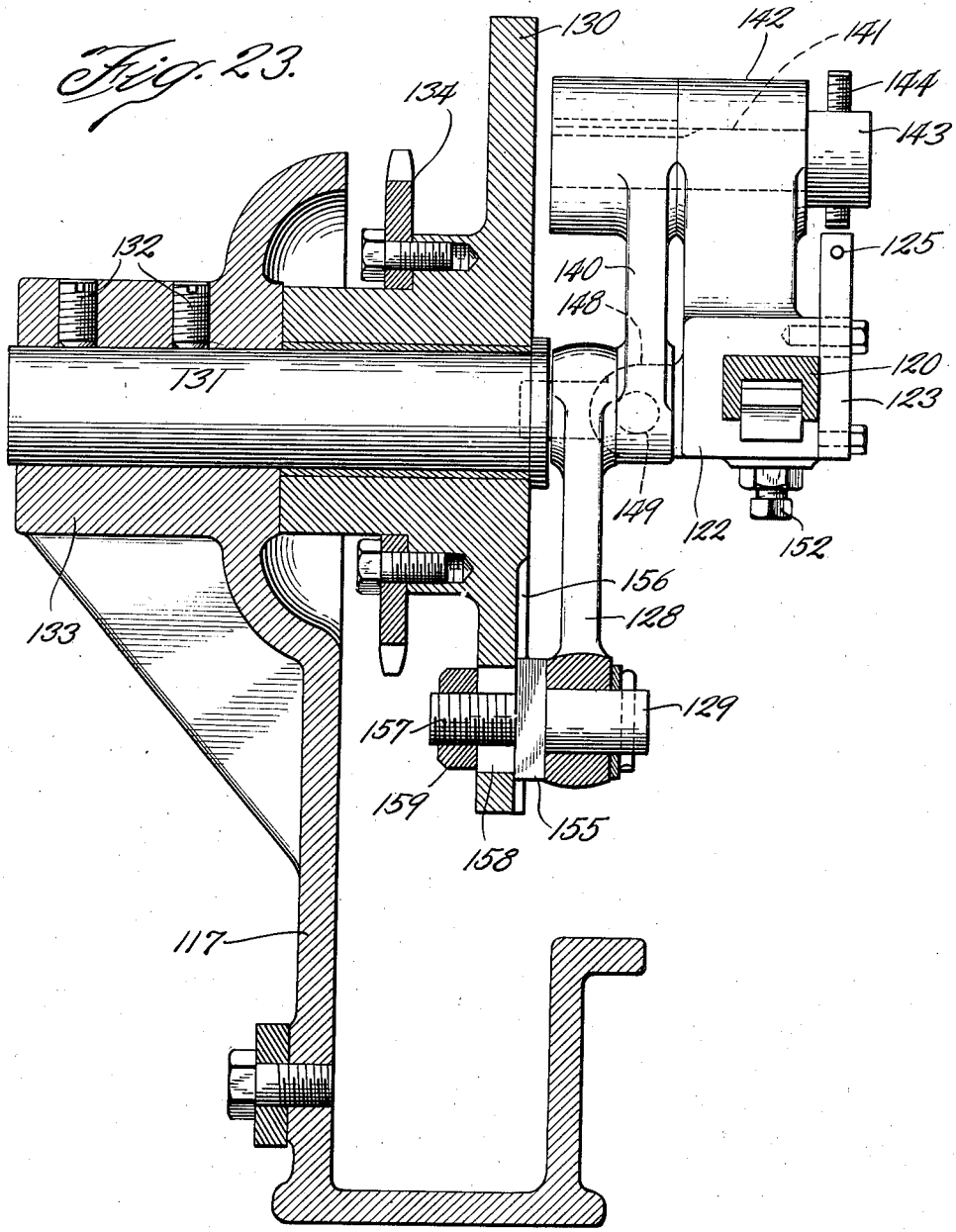

Figs. 5 and 6 are similar horizontal sectional views taken substantially on the lines 5—5 of Figs. 3 and 4, Fig. 5 showing the wire cutting and handle forming slide in the retracted position and Fig. 6 showing said slide just after completion of its wire cutting and handle forming operation;

Fig. 7 is a horizontal sectional view taken substantially on the lines 7—7 of Figs. 3 and 4 showing the slide for bending the ends of the handle wire against the outer side of the basket rim, said slide being shown in this figure in the fully retracted position;

Fig. 8 is a fragmentary view partly in horizontal section on the lines 8—8 of Figs. 3 and 4 and shows the mechanism for rocking the anvils against which the wire ends are driven in the handle attaching operation;

Fig. 9 is a vertical sectional view on the lines 9—9 of Figs. 5 and 14, but showing the parts in the position in which they appear in Fig. 5 rather than that of Fig. 14;

Fig. 10 is an enlarged front view of the handle driving mechanism showing the parts thereof in the positions they occupy just after the wire has been bent into the handle form;

Fig. 11 is a view of the handle driving mechanism looking at same from the rear and with portions broken away, said view being a vertical section taken substantially on the line 11—11 of Fig. 3 and showing the parts thereof in the positions they occupy after the wire ends have been bent downwardly preparatory to driving through the basket rim;

Fig. 12 is a view similar to Fig. 11 showing the wire ends partly driven through the basket rim;

Fig. 13 is a horizontal sectional view taken on the lines 13—13 of Figs. 3 and 11;

Fig. 14 is a vertical sectional view on the line 14—14 of Fig. 3 at the location of followers which trail the looped end of the handle as it descends in the driving operation;

Fig. 15 is an enlarged fragmentary section taken substantially on the line 15—15 of Fig. 7 and showing the parts thereof in the positions they occupy just after the wire has been bent in the handle form;

Figs. 16, 17 and 18 are views similar to Fig. 15, Fig. 16 showing the parts after the wire ends have been bent downwardly ready to be inserted through the basket rim, and Fig. 17 showing the parts when said ends are partly inserted through the basket rim and Fig. 18 showing the parts at completion of the handle attaching operation and some parts of Figs. 17 and 18 being shown on varied section lines to better disclose details of construction;

Fig. 19 is a sectional view taken substantially on the line 19—19 of Fig. 18;

Fig. 20 is a perspective view of one of the pivoted clinch blocks or anvils against which the wire ends are driven;

Fig. 21 is a sectional view of a clinch block carrier taken on the line 21—21 of Fig. 16;

Fig. 22 is a perspective view of the wire end deflector which is mounted on the top of the anvil bracket;

Fig. 23 is an enlarged sectional view of the wire feeding mechanism taken on the line 23—23 of Fig. 2;

Fig. 24 is a front view of the wire gripping mechanism of the wire feed;

Fig. 25 is a sectional view taken substantially on the lines 25—25 of Figs. 2 and 24;

Fig. 26 is a perspective view of the notched wire guide which forms a part of the wire gripping mechanism; and Fig. 27 is a perspective view of the brake shoe for frictionally resisting operation of the wire feed carriage.

Referring to the drawings which show an embodiment of my invention for forming wire handles and attaching them to baskets, it is to be understood that the basket to which the handles are attached may be of any desired type, that for which the illustrated machine is designed being of the round bushel basket type, as indicated by dotted lines at 31 in Fig. 3, which in accordance with the prevailing practice and as shown by the fragmentary portions thereof in Fig. 1 and elsewhere, has a side wall 32 of thin panels or strips which are secured at their upper ends between inner and outer hoops which constitute the basket rim 33 to which basket handles are usually attached. The handles, one of which is indicated at 34 in Fig. 1, are of the same general form as those heretofore used, being made of wire which is bent to provide a middle portion 35 with a depending leg 36 at each end which extends downwardly along the outer side of the basket rim and terminates in an angular portion 37 which is engaged through the basket rim, the wire therebeyond being bent upwardly against the inner face of the rim as at 38, then over the top of the rim as at 39 and then downwardly against the outer face of the basket rim as at 40 to securely attach the handle to the basket rim.

The machine which is shown herein for making and attaching these handles feeds the wire 41 for the handles to cutting and forming mechanisms which cut off the proper length of wire for the handle and first form it in a bail shape, as shown in Fig. 6, with the middle portion 35 and parallel legs 42, the outer ends of which said legs 42 are bent downwardly at 43 to provide attaching portions 44 which as shown in Fig. 16, are at right angles to the remaining handle legs 36, and these attaching portions 44 are thereafter punched through the basket rim 33 and bent therearound and become the parts 37, 38, 39 and 40 of the attached handle as shown in Fig. 1. This machine has a base 45 with an upwardly extending hollow standard 46 near the forward end, which said standard at its lower end encloses a crank disk 47 and a sprocket 48, both of which are fixed on a main shaft 49 which is journaled in a bearing 50 of the standard 46 and in a bearing 51 of the bracket 52 at the rear end of the base 45 and has a loose drive pulley 53 on the rear end for rotating the shaft 49 at the will of the operator through a clutch 54 which is controlled by the treadle 55. The clutch 54, which is of the one revolution type, is disengaged after each revolution of the shaft 49 by the detent 56 which is pivoted at 57 to an offset 58 of the bracket 52 so as to ride in the clutch groove 59 and this detent 56 is connected by the link 60 with the rear end of the treadle 55 so that pressure on the tread plate 61 at the forward end of the treadle lifts the detent 56 sufficiently to permit engagement of the clutch to rotate the shaft 49 with the pulley 53. Upon release of the forward end of the treadle 55 the detent 56 returns to the clutch disengaging position in the groove 59 and upon completion of the revolution of the shaft 49, disengages the clutch. Details of the construction of this clutch are not shown as such clutches are well known. A brake band 62 which cooperates with a brake drum 63 on the shaft 49 is also controlled by the treadle 55 so as to assist in stopping the shaft 49 and the parts connected therewith promptly upon disengagement of the clutch.

An elongated former guide box 64 is secured to the top of the standard 46 by cap screws 65 engaged through side flanges 66 of the standard 46 and the rear end of this guide box is cut out at 67 to accommodate a cam disk 68 which is fixed on the upper end of the cam shaft 69, said shaft 69 being journaled in the bearing brackets 70 and 71 on the rear of the standard 46, and operated simultaneously with and at the same speed as the drive shaft 49 through the bevel gears 72 and 73 on the shafts 49 and 69 respectively.

A top casting 74 covers the top of the former guide box 64 and the cam opening 67 thereof, said casting being secured to the former guide box 64 by the cap screws 75, and this casting 74 and the guide box 64 have aligning openings 76 and 77 respectively therethrough and through the hubs 78 and 79 respectively thereof in which the handle driver shaft 80 is mounted to reciprocate, the lower end of said shaft being connected, within the standard 46 by the link 80 with the crank pin 81 on the crank disk 47 so that said vertical shaft 80 is reciprocated by the drive shaft 49.

Mounted on the front of the standard 46 just below the forward end of the former guide box 64 is an anvil bracket 82 with clinch blocks or anvils 83 therein which support the portion of the basket rim 33 where the handle 34 is to be attached, and this bracket 82 has a front plate 84 secured thereto and provided with a curved nose 85 at the top for directing the basket rim onto the top of the anvil bracket 82. A plate 86 of semi-circular form, as shown in Fig. 2, is mounted at the front of the standard 46 below the anvil bracket 82 to provide an abutment for engagement by the basket rim in placing the basket in position, and this plate 86 has a pair of side lugs 87 secured thereto and provided with beveled outer faces 88 for engaging inside the basket rim and centering the basket. Said plate 86 also has a transverse rib 89 near the bottom with beveled top face 90 which is useful in locating the basket at the proper elevation so that the portion of the basket rim which is at the top will engage readily over the nose 85 and onto the anvil bracket 82 which has a stop 91 at each side against which the basket rim is engaged so as to insure proper positioning thereof for the attachment of the handle.

The basket handles are attached to the basket rim at diametrically opposite sides and after one handle has been attached, it is necessary to give the basket a half turn to present the diametrically opposite portion of the basket rim over the anvil bracket 82 to have the other handle attached thereto. Upon giving the basket the necessary half turn, the handle that has just been attached is then located at the bottom and to accommodate the handle at this place the plate 86 is cut out as at 92 and provided with opposed rearwardly extending flanges 93 which are inclined inwardly to guide the handle to a central position between the inner edges of said flanges and these flanges thus cooperate with the side lugs 87 to insure proper positioning of the basket for attachment of the second handle at a place diametrically opposite the location of the first attached handle.

The former guide box 64 which is mounted directly on the top of the standard 46 has the top face recessed as indicated at 94 to provide a slideway with side walls or flanges 95 and 96 (the latter being cored out at 97) for a combined handle former and wire cutter which is held in place therein by the top casting 74, the wire cutter being adapted to cooperate with a wire tube 98 secured on a boss 99 at the forward end of the side flange 95 to cut off a length of wire from the wire 41 which is fed through said tube 98 in front of the handle former 100 and said handle former being adapted to cooperate with a forming block or loop bar 101 to bend the cut off length of wire into the bail shape indicated in Fig. 6.

The forming block or loop bar 101 is secured by screws 102 (Fig. 15) against the rear face of the abutment or lug 103 which depends from the front end of the top casting 74 over the anvil bracket 82 and said forming block 101 has a downwardly opening groove or channel 104 in which the middle portion 35 of the handle wire is held in the handle forming operation, the former 99 which is bifurcated at the forward end and straddles the vertical shaft 80 has spaced arms 105 with hardened inserts 106 at their forward ends which are projected across the ends of the groove or channel 104 to bend the projecting portions of the wire forwardly as at 42 in Fig. 6. The inserts 106 have wire grooves 107 (Fig. 4) in their inner faces to accommodate the forwardly bent portions 42 of the wire, and the ends of the former arms 105 are notched at 108 (Fig. 4) to insure centering of the wire in the plane of these grooves 107 at the time the bending occurs.

The wire cutter is located in the slideway 94 alongside the former 100 and comprises the knife bar 109 with the knife insert 110 at the forward end to cooperate with the inner end of the tube 98 in cutting off the required length of wire, and this knife bar 109 is caused to operate with the former 100 through an adjustable connection at the rear end whereby the cutting operation can be accurately timed to properly precede the bending which occurs immediately after the length of wire is cut off. This adjustable connection comprises a strap 111 which is secured to the rear end of the former 100 and connected with the rear end of the knife bar 109 by the push and pull screws 112 and 113 respectively, which are readily accessible from the rear open end of the former guide box 64 to adjust the knife bar 109 longitudinally with respect to the former 100 and thereby advance or retard the wire cutting relatively to the bending operation.

For operating the combined cutter 109 and former 100, said former 100 has on the under side near the rear end a pair of transverse ribs or flanges 114 which provide a guideway therebetween for a block 115 which is secured to the cam disk 68 by the pivot pin 116 so that as the cam disk 68 is rotated the combined former 100 and cutter 109 is reciprocated in the slideway 94, the block 115 of course sliding between the flanges 114 to accommodate itself to the circular path of the pivot pin 116.

For feeding the wire 41 intermittently through the tube 98 as required for the basket handles, a wire feeding mechanism which is shown in detail in Figs. 23 to 27 inclusive, is mounted at one side of the machine on a bracket 117 which is secured to the side of the machine standard 46 at 118 and 119. This bracket has a horizontal rail 120 with a channel 121 in the under side mounted thereon parallel with and below the path of movement of the wire 41, and this rail 120 has an elongated carriage 122 slidably mounted thereon and held in place on the rail 120 by straps 123 and 124 which project upwardly in the path of the wire 41 and serve as guides therefor, the straps 123 having openings 125 at their upper ends through which the wire 41 passes and the strap 124 having a wire groove 126 at the top with a transverse notch 127 as shown particularly in Fig. 26. This carriage 122 is connected by a link 128 with a crank pin 129 on the disk 130 which rotates on a stem 131 which is secured by set screws 132 in a mounting hub 133 of the bracket 117. A sprocket 134 is secured on the rear of the disk 130 and operated by the chain 135 from the sprocket 48 on the drive shaft 49, said sprockets 48 and 134 being of the same size so that the disk 130 and drive shaft 49 rotate in unison, and the carriage 122 by its link connection 128 with the disk 130 will accordingly be given a complete reciprocatory movement back and forth along the rail 120 each time the drive shaft 49 makes a complete revolution. To maintain the chain 135 at the proper tension to avoid inaccuracy of timing, a chain tightener is provided comprising an idler roll 136 mounted on a bar 137 which is secured to the web portion of the bracket 117 by cap screws 138 engaged through slots 139 at the ends of the bar 137 so that the roll 136 may be adjusted to eliminate any unnecessary slack in the chain 135.

The link 128 is not connected directly to the carriage 122 but to the lower end of a rocker arm 140 which is fixed on the rear end of a shaft 141 which is journaled in an elevated bearing 142 of the carriage 122. An arm 143 is fixed on the forward end of the shaft 141 and has a gripper stud 144 engaged through an opening at the outer end and held in place by a set screw 145 in position for the lower end thereof to enter the notch 127 of the wire guide 124 and grip the wire 41 in the wire groove 126, the end face of the stud 144 being serrated as at 146 for this purpose. Preferably the stud 144 is reversible with a serrated face 146 at each end and is threaded to accommodate a nut 147 for adjusting purposes and also to bear the wire gripping impact. The rocking movement of the arm 140 to which the carriage operating link 128 is attached is thus limited when pull is exerted on the arm 140 to move the carriage toward the machine and feed the wire, and for limiting the movement of the arm 140 in the reverse direction when the link 128 acts to push the carriage 122 outwardly away from the machine to take a new grip on the wire, a lug 148 is provided on the carriage 122 with a screw 149 engaged therethrough to provide an adjustable stop against which the lower end of the arm 140 engages in the outward movement of the carriage.

To insure a positive and effective gripping of the wire by the gripper stud 144 in the wire feeding movement of the carriage, it is desirable that the carriage be restrained against free and easy movement along the rail 120 and to this end the carriage 122 has a brake band 150 thereon in the channel 121 of the rail and provided with a facing 151 of brake material which is held in frictional contact with the rail by screws 152 which are engaged through the bottom flange of the carriage 122 and may be adjusted to provide the desired resistance to sliding movement of the carriage 122 along the rail 120.

The wire 41 is supplied to the wire feeding mechanism from any suitable source (not shown) through two sets 153 and 154 of straightening rolls which are mounted at the outer end of the bracket 117 and offer sufficient resistance to retrograde movement of the wire so that no special wire holding devices are required to prevent movement thereof with the carriage when the latter is retracted, it being understood that the guide openings 125 through the straps 123 are such that the straps slide readily along the wire at that time and that, on account of the frictional resistance of the brake 150—151 to the movement of the carriage, release of the gripping member 144 from the wire is assured before retracting movement is imparted to the carriage and as the strap 124 is then free to move along the wire 41 there is no backing up tendency imparted to the wire.

The amount of wire fed forward at each wire advancing operation of the carriage 122 depends upon the length of stroke imparted to the carriage by the crank disk 130 and link 128, and in order that the length of stroke and amount of wire fed may be regulated the crank pin 129 is radially adjustable on the disk 130. To this end the crank pin 129 is formed with a square nut like enlargement 155 which fits in a radial recess 156 in the face of the disk 130 and has a threaded stem 157 extending through a radial slot 158 in the disk 130 with a nut 159 thereon for clamping the crank pin 129 in any desired position of its radial adjustment.

After each length of wire has been cut off and formed into a handle, the wire feeding mechanism advances the wire a sufficient distance to provide another piece of wire of proper length for the next handle and it is of course necessary to insure that the leading end of the wire is inserted through the groove or channel 104 of the handle forming block 101. A wire guide is accordingly provided between the inner end of the wire feed tube 98 and the handle forming block 101 which said guide comprises a stationary top block 160 which is secured by the cap screw 161 to the under side of the top casting 74 and a plunger 162 which is secured in a notch 163 in the forward end of the former guide box 64 by the plate 164 which has a ledge 165 which projects into the notch 163 and supports a pair of springs 166 which are seated at their upper ends in the plunger 162 and resiliently hold the latter in an elevated position against the top block 160. This plunger has a wire groove 167 extending across the top thereof which in the elevated position of the plunger 162 is closed by the top block 160 and is in line with the wire opening of the wire feed tube 98 in proper position to direct the wire into the wire groove or channel 104 of the handle forming block 101 and at the proper elevation therein for engagement by the handle forming slide 100, and to facilitate entry of the end of the wire 41 into the grooves 167 and 104 the entrance ends of these grooves are beveled or flare slightly as at 168 and 169 respectively.

The knife bar 109 which is projected forwardly past the wire guide 160, 162 in the wire cutting and handle forming operation is cut away at 170 to clear the top block 160 while the guide block 162 is adapted to be displaced from the path of the wire cutter at the time, said guide 162 being provided for this purpose with a beveled face 171 which, in the forward movement of the knife bar, is engaged by a beveled face 172 on the forward end of the knife bar so that the guide block 162 is thereby depressed against the tension of the springs 166 which, as soon as the cutter 109 is retracted, return the guide block to the upraised position against the top block 160.

The feed tube 98 and also the guide block 162, which remains in the elevated position until almost the instant of cutting and bending, hold the wire at the proper elevation at one side of the former block 101 and at the other side the end of the wire is prevented from sagging by a block 173 which is secured by cap screws 174 in a notch or seat 175 (Fig. 3) at the forward end of the former guide box 64. A plate 176 which is secured over the block 173 by a cap screw 177 engaged through the slot 178 of the top casting 74 provides a space 179 therebetween for the end of the wire which is guided thereto by the inclined faces 180 and 181 of the block 173 and plate 176 respectively, and this space 179 is open at the front of the machine so that the end of the wire in said space, like the cut off end of said wire at the other side of the forming block 101, is free to swing forwardly in the forming operation to the position indicated at 42 in Fig. 6.

The top casting 74 supports at its front end over the anvil bracket 82 mechanisms which are operable after the wire is bent in the bail shape, shown in Fig. 6, to bend the outer ends of the wire legs downwardly as at 44 in Fig. 16 and to drive said downturned ends 44 through the portion of the basket rim on the anvil bracket 82, and to accommodate these mechanisms the top casting 74 has an upwardly extending mounting plate 182 at the front with side flanges 183 to which a face plate 184 is secured by screws 185 to provide a housing for the mechanisms which form and drive the wire ends 44, and it is to be noted that the face plate 184 has a depending lug portion 186 corresponding to and spaced from the depending lug 103 of the top casting 74.

The outer face of the mounting plate 182 has a vertical slideway 187 between the side flanges 183 for a two part driver comprising the spaced driver legs 188, which are secured at their upper ends by screws 189 to a transverse flange 190 at the front end of the top arm 191 which is secured to the upper end of the shaft 80 by set screws 192. A pair of wire supporting fingers 193 are separately pivoted in the recess 187 of the mounting plate 182 on the projecting ends of stems 194 which extend inwardly through the top casting 74 and are secured in place by set screws 195 and these fingers 193 are thus disposed in the plane of and between the lower ends of the driver legs 188.

A former or bending slide 196 of a width somewhat greater than that of the depending lugs 103 and 186 of the top casting 74 and face plate 184 respectively is located in front of the fingers 193 and the driver legs 188 and is keyed to the face plate 184 to slide vertically, a key 197 being secured by rivets 198 in a key seat 199 in the front face of said former or slide 196 and engaged in a vertical key way 200 in the rear face of the face plate 184. The former or slide 196 is secured to the inturned lower end of a rod 201 which extends loosely through a lug 202 on the top arm 191 and has a spring 203 thereon interposed between the lug 202 and a collar 204 on the rod 201 to provide a compressible connection whereby the bending slide 196 is resiliently propelled downwardly by the top arm 191, the rod being retained in engagement with the lug 202 by a nut 205 on the upper end of the rod. A notch 206 is provided in the face plate 184 to accommodate the lower end of the rod 201 and collar 204 in the downward movement thereof with the slide 196. A positive driving connection is also provided for the slide 196, which said connection is adapted to be released at a certain point in the downward movement of the slide, and for this purpose each driver leg 188 has a latch member 207 pivoted in front thereof and provided with a notch 208 at its lower end which is normally held in engagement with an upper corner of the slide 196 by a spring 209. For mounting these latch members 207, each driver leg 188 has a lug 210 secured in front thereof at the upper end by the driver leg attaching screw 189 and each lug 210 has a depending ear 211 with an inwardly extending pin 212 on which the respective latch 207 is pivoted between the ear and driver leg, the inner end of each pin 212 being seated in an opening 213 provided therefor in the respective driver leg 188. Each lug 210 has a spring socket 214 to accommodate the spring 209 which has the lower end engaged in a spring seat 215 of the respective latch member 207.

Each latch member 207 has a roller 216 projecting forwardly from the lower end which at a certain point in the downward movement thereof with the driver legs engages a deflector face 217 on the rear of the face plate 184 and by which the roller 216 is deflected laterally into a roller groove 218 so that the latches 207 are released from, and thereafter in further downward movement of the driver legs, are held out of engagement with the slide 196 so that further downward movement of the slide is through the resilient pressure of the spring 203.

The fingers 193 are controlled by the driver legs 188 which have flat inner face portions 219 normally engaged with the offset upper ends 220 of the fingers to hold said fingers in the position shown in Fig. 10 with the lower portions thereof projecting laterally from the depending lug 186 of the face plate and each finger 193 has a notch 221 in the outer edge which at that time is exposed at the side of the lug 186 and is at substantially the elevation of the wire that is cut off and folded in the bail shape, the arrangement being such that when the cut off piece of wire is folded in the bail shape, the legs 42 thereof are swung forwardly and inwardly over the shoulders 222 of the notches 221 leaving wire ends projecting outwardly beyond the fingers 193 of sufficient length to provide attaching portions for punching through the basket rim and clinching therearound.

After the wire has been bent in this form, as shown at 35, 42 in Fig. 6 with the legs located over the shoulders 222 of the notches 221 the top bracket 19 is moved downwardly by the shaft 80 at which time the slide 196 is positively operated therewith by the latches 207 and engages the projecting ends of the legs 42 and bends them down to the position shown at 44 in Fig. 16. These bent down ends are quite long and it is desirable that they be enclosed in guides during the subsequent driving operation and the slide is accordingly provided on the inner face with wire grooves 223 to accommodate the turned down ends 44 of the wire and as the slide 196 operates immediately in front of the fingers 193 the open sides of the grooves 223 are closed by the lower portions of the fingers and the downturned wire ends 44 are thus locked in the grooves 223. To insure centering of the wires 42 in line with the grooves 223 as the slide 196 descends, each lower corner of the slide is formed with a wire notch 224 with the outer side of the notch sloping downwardly to cooperate with the shoulders 222 of the fingers 193, which said shoulders slope upwardly all as shown in Fig. 10, so that if the wire legs 42 are not already in line with their respective grooves 223, they are deflected thereto just before the wire ends are bent downwardly.

After the wire ends are bent downwardly the driver legs 188 and slide 196 remain latched together and move downwardly in unison until the lower ends of the driver legs near the horizontal portions of the wire legs on the shoulders 222 of the fingers 193 at which time the rollers 216 of the latches 207 engage the inclined faces 217 of the face plate 184 and deflect these rollers outwardly into the roller grooves 218 and thereby release the latches 207 from the slide 196 after which the slide continues to move downwardly under the tension of the spring 203 until the bottom edge of the slide engages against the top surface of the work after which any further downward movement of the driver head merely compresses the spring 203.

As the lower ends of the driver legs reach the horizontal portions of the wire legs on the shoulders 222 of the fingers, it is necessary for the lower ends of the fingers to swing inwardly to free the wire legs from said shoulders and the driver legs 188 are accordingly cut away at their inner sides as at 225 so that as the driver legs engage the wire on the shoulders 222 the cut back portions 226 of the driver legs come opposite the offset upper ends 227 of the fingers and as driving pressure is applied to the wire on the shoulders 222 these shoulders 222 are thereby swung downwardly and inwardly to clear the wire which thereafter slides down the outer edges 228 of the fingers and off of the lower ends thereof as the driver legs 188 proceed downwardly, the driver legs 188 being suitably formed above the initial offset 226 to gradually release the upper ends 227 of the fingers 193 appropriately to permit the necessary inward swinging of the lower ends of the fingers as the wire legs are propelled downwardly by the driver legs 188. By reason of this arrangement the grooves 223 in which the downturned wire ends 44 are located are progressively uncovered as the wire ends are forced downwardly so that the lower portions of the fingers 193 confine the undriven portions of the wire ends throughout the driving operation and until the wires pass off of the bottom extremities of the edge faces 228 at which time the wire ends 44 are practically fully driven. This confining of the wire ends during driving is particularly important in view of the length of the ends that are to be driven and also in view of the bending operation performed on the wire as it passes through the basket rim, all of which subject the undriven portions of the wire to severe buckling and displacement strains which are effectively safeguarded against by the complete confinement of the wire in the grooves 223 of the slide 196. The driver legs 188 have ribs 229 at their lower ends along the outer side which correspond to and slide in the grooves 223, and these grooves are of course extended upwardly so as to accommodate these ribs throughout the range of relative movement of the driver legs and slide. Preferably the slide 196 has grooves 223 on both sides as well as the recess 199 for the key 197 so that said slide is reversible. Also the lower ends of the driver legs 188 are preferably formed of hardened attachments as indicated at 230 which are secured in shouldered seats 231 and the places where they engage the wires are notched as at 232 to straddle the wire.

As the above mentioned driving operation occurs the wire handle member is moved downwardly bodily, thereby releasing the middle portion 35 from the slot 104 of the former block 101. Preferably a guide plate 233 is secured to the depending lug 103 of the top casting by screws 234

(Fig. 15) to form a depending continuation of the front half of the former block and preventing any downward and forward swinging of the middle portion 35 of the handle member as it is driven and moreover a pair of follower rods 235 are also provided which straddle the forward portion of the former block and the guide block 101 and are arranged to trail the side wires or handle leg portions 36 near their rear extremities as the wire member is moved downwardly in the driving operation.

These follower rods 235 are resiliently connected at their upper ends to the top bracket 191 which has openings 236 through which these rods are slidably engaged, and the upper projecting end of each rod has a nut 237 threaded thereon for elevational adjustment of the rod and to limit downward movement of the rod in its opening 236. Each of these openings is enlarged at 238 to provide a chamber for a spring 239 which is seated at its lower end against a sleeve 240 which slides in the lower end of the opening 238 and is secured on the rod by the set screw 241. The top casting 74 is bored out at 242 to provide slideways for the rods which are milled down to a half round form below the sleeves 240 to provide flat side faces next to the former block 101 and guard 233 and the slideways 242 are provided with half round inserts 243 held in place by screws 244 to fill in the slideways 242 to the half round form of the follower rods 235.

Prior to each handle forming and applying operation of the machine, a basket is placed in the position indicated by dotted lines at 31 in Fig. 3 with the portion of the basket rim where the handle is to be attached positioned over the anvil bracket 82 and against the stops 91 which locate the rim in position, as shown in Fig. 16, for the downturned ends 44 of the handle wire to be punched therethrough and facilities are provided which, as the handle ends 44 are punched through the basket rim, deflect said ends rearwardly under the basket rim and upwardly across the edge thereof and finally bend the extremities forwardly and downwardly against the outer face of the basket rim as shown in Figs. 1 and 18.

For deflecting the ends of the attaching portions of the wire in the above manner, the clincher blocks 83 are provided and are located under the portions of the basket rim through which the wire ends 44 are punched. These clincher blocks, which are independently pivoted, have deflector grooves 245 in the top faces which deflect the wire ends inwardly and upwardly as shown in Fig. 17, and upon final insertion of the attaching ends these clincher blocks are rocked upwardly to clamp and hold the wire portions 36 against the under side of the basket rim while bending slides or rams 246 are projected forwardly to bend the upturned ends of the wire against the inner edge of the basket rim and down against the top face of the basket rim as shown in Fig. 18, and it is to be noted that the grooves 245 of the clincher blocks have their inner walls 247 angularly arranged to deflect the wire ends slightly sidewise away from one another so that the wire ends are deflected upwardly at the outer sides of the handle legs 36 and at a sufficient distance therefrom to freely accommodate the bending slides 246 at the outer side of the handle legs. Moreover to cooperate with these angular inner walls 247 of the deflector grooves 245 and insure proper positioning of the upturned wire ends for engagement by the bending slides or rams 246, a wire guide 248 is adjustably secured by an attaching shank 249 and screws 250 through slots 251 thereof to the top of the anvil bracket 82 with the outer face of said guide 248 substantially in line with the outer faces of the stops 91 as shown in Fig. 7 and this guide 248 has beveled end faces 252 by which the upturning ends of the driven wire ends are guided to a predetermined location in front of the respective bender slide 246. The bender slides 246 in their forward bending movement project over the extreme ends of the wire guide 248 as shown in Fig. 7 as well as over a nose portion 253 of the respective stop 91, there being a space between the respective end of the wire guide 246 and said nose portion 253 to accommodate the upturned wire, and the wire guide 246 has a notch 254 in the top face adjacent each end under the respective handle leg 36 so as to assure ample clearance for the handle leg.

The bending slides 246 are located in a guideway 255 formed in the bottom face of the former guide box 64 and are held therein by the top face of the machine standard to which the guide box is secured and as the handle drivers 188 have a fixed length of stroke terminating at a level corresponding substantially to that of the bottom faces of the bending slides which are at a fixed level and are projected over the top of the basket rim on the anvil bracket 82, it is necessary that the portions of the basket rim where the handle legs are attached, irrespective of the thickness of the rim, be capable of being depressed by the drivers 188 and the spring pressed slide 196 so that the top face of the rim is at the proper level for the bending slides 246 to be projected thereover. Sometimes the handle may be attached at the lap of the inner or outer hoop which form the basket rim 33 or one handle leg may be punched through lapped parts of a hoop where the basket rim is considerably thicker than at the place where the other handle leg is attached, and it is accordingly necessary to support the basket rim on the anvil casting in a manner to accommodate any varying thickness of basket rim as well as varying thickness at the places where the legs of a handle are punched therethrough. The anvil bracket is accordingly provided with individual and independently movable supports for the clincher blocks 83 which together with their respective supports, support the basket rim in the driving and clinching operation and individually assume the proper level under the pressure of the drivers 188 and the intervening portion of the basket rim to position the top face of the basket rim at the proper level for the end bending slides to be projected thereover and in the same bending relation to said top face of the rim regardless of the thickness of the basket rim at that particular place.

Each clincher block 83 is accordingly pivoted on a pivot pin 256 between side walls 257 of a support 258 which is mounted to slide vertically in a slideway 259 of the anvil bracket 82 and has a stem 260 projecting downwardly therefrom through a plug 261 which is threaded into the bottom wall 262 of the anvil casting, and a heavy spring 263 is interposed between the plug 261 and bottom 262 of the support 258 to independently hold each support 258 and its respective clincher block quite firmly at an elevation determined by the lock nuts 264 on the lower end of each stem 260, it being understood that the springs 263 are sufficiently stiff to cause the bending operations to be performed in driving the attaching ends of the handles against the clincher blocks and at the same time will yield to the pressure of the drivers 188 to position the basket rim so that the top face thereof is at the proper level for the bending slides to perform their end bending operations, and it is further to be understood that each clincher block is independently adjustable under the basket rim pressure to the particular level necessary or required on account of the thickness of the portion of the basket rim thereon.

For rocking the clincher blocks 83 on their pivots 256 at the final insertion of the handle attaching portions, a cam 265 is fixed on the shaft 69 which is straddled by a yoke 266, said yoke being slidably confined between said cam 265 and the shaft bearing 71, as shown in Fig. 4, and this yoke has laterally spaced forward ends 267 which are connected respectively to the corresponding clincher blocks 83 by the pull rods 268 which extend through relatively large openings 269 in the standard 46, each clincher block 83 being formed at the lower end with spaced lugs between which the forward end of the respective pull rod 268 is pivoted on a pin 270 and the rear end of each rod 268 having a fitting 271 threaded thereon for adjustment and pivoted to the respective end 267 of the yoke 266 on a pin 272. A roller 273 projects downwardly from the rear end of the yoke 266 and the cam 265 is formed and timed to engage this roller 273, after the handle ends are inserted through the basket rim, and swing the clincher blocks 83 inwardly on their pivots 256 to the position indicated in Fig. 18, the return movement of said clincher blocks 83, which is positively effected by the driving of the attaching portions 44 of the handles thereagainst in the next handle attaching operation being limited by set screws 274 which may be adjusted to regulate the curling of the wire around the edge of the basket rim 33, and it is to be noted that the pivotal connection of the pull rods at both ends and the size of the openings 269 in the standard 46 not only permit free up and down movement of the clincher blocks 83 and their supports, but also the arcuate movement of the outer ends of the pull rods 268 in swinging the clincher blocks.

In the operation of driving the attaching portions of the handles through the basket rim, the bottom end of the bending slide 196 comes in contact with and presses against the top of the basket rim during which time and after the drivers 188 are fully depressed, the lower ends of the wire grooves 223, by their engagement with the wire, obstruct withdrawal of the basket rim and counteract the outward thrust that occurs in deflecting the wire ends upwardly and bending the upwardly projecting ends out over the top of the basket rim. As an added safeguard against such outward thrust, each clincher block support 256 is drilled as at 275 for a prong member 276 which is secured therein and has a pointed end projecting above the top of the support 256 and which in the handle attaching operation is embedded in the basket rim and holds the latter in place thereon.

The bending slides or rams 246 which perform the final operation of bending the wire ends outwardly over the top face of the basket rim preferably have hardened inserts 287 at their forward ends with flaring guide notches 288 at their forward lower edges to start the rams against and over the wire, and these rams 246 are secured at their rear ends in overlapping relation on the forward ends of the arms 277 of a yoke 278 which straddles the shaft 69 and has a cam plate 279 extending between said arms and secured thereto against the rear ends of the rams 246. The cam disk 68 which operates the former 100 in the manner explained hereinbefore is located at an elevation slightly above the top of the cam plate 279 and has a depending roller 280 which engages against the inclined face 281 to project the rams 246 forwardly at the proper time for bending the handle ends 40. A roller 282 is mounted on the yoke 278 at an elevation to be engaged by the periphery of the cam disk 68 which is cut away at the side diametrically opposite the roller 280 to provide a flat face 283 which permits the roller 282 to be projected forwardly with the yoke 278 as the roller 280 engages the inclined face 281 of the cam plate 279, and said flat face 283 has a continuation 284 which, after the roller 280 passes beyond the inclined face 281 of the cam plate, engages the roller 282 and retracts the yoke 278 and rams 246 which are held in the retracted position by the curved face 285 of the cam disk until the roller 280 again reaches the inclined cam face 284. To insure ample clearance for the ends of the wire as the parts 40 are bent down against the top face of the basket rim, as well as clearance for the top edges of the beveled parts 252 of the wire guide 246, the lower extremities of the drivers 188 are cut away as at 286.

All of the foregoing parts are suitably timed so that in the operation of the machine, wire is fed by the wire feed mechanism across the front end of the former guide box 64 and through the groove 104 of the former block and a length thereof cut off by the cutter knife 110 to form the handle. The former legs 105 then move forwardly past the ends of the former block 101 and bend the wire into the bail shape shown in Fig. 6 with the legs 42 lying in the notches 221 of the fingers 193 and ends which are to form the attaching portions projecting therebeyond. The end bender 196 then bends the projecting ends downwardly and continues its downward movement until arrested by the basket rim on the anvil bracket, the thus formed attaching ends 44 being located in the grooves 223 of the former and locked therein against lateral displacement by the fingers 193. The drivers 188 then engage the wire arms 36 at and adjacent the bend 43 and directly over the shoulders 222 of the fingers 193 and, after displacing the shoulders 222, slide the driver engaged portions of the wire down the edge faces 228 of the fingers 193 and drive the attaching ends 44 through the basket rim during which time the fingers 193 are progressively withdrawn from the open side of the gradually uncovered grooves 223. As the lower ends of the attaching portions 44 are projected through the basket rim they strike the grooves 245 of the clincher blocks 83 and are deflected inwardly as shown in Fig. 17, and curled up across the edge of the basket rim, and as said portions 44 are fully inserted, the clincher blocks 83 are rocked by the cam 265 to jam the portions 38 against the under side of the basket rim, whereupon the rams 246 are projected forwardly and bend the upwardly projecting ends over and against the top face of the basket rim as shown in Fig. 18, the parts 39 being thereby and at the same time jammed against the edge of the basket rim. The rams 246 and driving devices are then retracted and the drive shaft 49 having made a complete revolution is disconnected from the drive pulley 53 by the detent 56 and stopped by said detent, and the brake 62, 63, whereupon the basket rim is removed from the anvil bracket 82 and after giving the basket a half turn, the diametrically opposite portion of the rim is placed over the anvil bracket and the pedal 61 depressed again whereupon another handle is formed and attached in the same manner.

From the foregoing it will be noted that the arrangement of the fingers 193 as above described, permits the arms 42 of the wire of Fig. 6 to be engaged directly in the finger notches 221 above the shoulders 222 thereof as the wire is bent into the bail shape of Fig. 6 and without any bodily movement of the wire as a whole from the inserted position such as has been necessary heretofore in cases wherein finger like members have engaged the legs of the bail from the outer sides,—that the attaching portions of the wire which are driven through the basket rim are fully confined throughout substantially their entire length against displacement during the driving operation, the fingers being progressively withdrawn from the open sides of the wire grooves or channels 223 as the drivers 188 descend so that substantially any desired length of attaching ends may be employed and driven against clinching resistance without danger of buckling or displacement of the wire that is being driven; that the rim supporting devices individually accommodate themselves to any thickness of rim at the particular places where the handle attaching portions are driven therethrough,—that the final ends of the wire are uniformly and accurately clinched in a satisfactory manner against the top face of the basket rim by the bending slides regardless of the length of these final ends which may vary due to the thickness of the basket rim at the particular place where the attaching portions of the wire are punched therethrough,—and that the various parts are operated in a simple and direct manner, all of which features, as well as others, while particularly advantageous in a handleforming and attaching machine may be employed in machines for other similar purposes.

It is accordingly to be understood that while I have shown and described my invention in a preferred form, I am aware that various changes and modifications may be made therein without departing from the principles of my invention, the scope of which is to be determined by the appended claims.

I claim as my invention:

1. In an apparatus for forming and attaching bail shaped wire members, the combination of guiding means with spaced channels and mechanism cooperable therewith to bend a length of wire into the form of a bail with spaced legs having attaching portions extending laterally from the ends thereof in said channels of the guiding means, closing means at the open sides of said channels for confining said attaching portions of the bail therein, driving facilities by which said attaching portions of the bail are propelled along and expelled from the channels, said mechanism being operable to position portions of the legs of the bail between the driving facilities and the channel closing means as the legs are brought to their spaced relation in the bail forming operation, and said closing means being withdrawn from the open sides of the channels in a manner to progressively shorten the closed portions of the channels as the attaching portions of the bail are propelled along and expelled therefrom by the driving facilities.

2. In an apparatus for forming and attaching a bail shaped wire member, the combination of forming facilities operable to bend a length of wire into bail shape with a pair of spaced legs terminating in laterally extending attaching portions, said forming facilities including means whereby a part of the wire is retained at the same location throughout the formation of the bail legs and their attaching portions, confining means providing substantially a surrounding enclosure for the attaching portions of the bail, and driving facilities operable in a direction transverse to the bail legs to engage said legs and expel their aforesaid attaching portions lengthwise from the confining means and to simultaneously displace the aforesaid retained part of the wire from the location which it occupied throughout the formation of the bail legs and their attaching portions, said confining means including members operable to progressively release the bail leg attaching portions as they are expelled from the confining means.

3. In an apparatus for forming and attaching a bail shaped wire member, the combination of a driver, wire holders in the path of and cooperable with the driver to progressively recede therefrom as the driver advances, bending means operable to bend a length of wire to a driver obstructing position and thereby form a bail with legs crossing the path of the driver between the driver and wire holders, and means having channels facing the wire holders and extending along the path of the driver to accommodate angular bail leg ends and said driver being operable to expel the angular bail leg ends longitudinally from the channels.

4. In an apparatus for forming and attaching bail shaped wire members, the combination of wire holders, devices operable to bend a length of wire into bail form with laterally spaced legs straddling the wire holders, driving means operable to attach the bail to the work and said wire holders being operable to progressively release the bail legs in the attaching operation of said driving means.

5. In an apparatus for forming and attaching bail shaped wire members, the combination of devices operable to bend a length of wire into bail form with laterally spaced legs, wire holders having outwardly facing shoulders for the legs, means cooperable with said shoulders to bend the ends of the legs laterally from the plane of the bail, driving means operable to engage said laterally bent ends with the work, said wire holders having portions in the path of the driving means and progressively retracted therefrom in the driving operation.

6. In an apparatus for forming and attaching bail shaped wire members, the combination of devices for bending a length of wire into bail shape with laterally spaced legs, driving means, wire holders having shoulders between which and the driving means the bail legs are positioned in the bail forming operation of the said bending devices, means cooperating with the shoulders to bend the ends of the bail legs at an angle thereto, and said wire holders having portions in the path of the driving means and progressively retracted therefrom in the driving operation of said driving means.

7. In an apparatus for forming and attaching bail shaped wire members, the combination of a pair of pivoted fingers, devices for bending a length of wire into bail shape with laterally spaced legs straddling the fingers, driving means operable to propel the legs along the fingers and said fingers being progressively retracted inwardly toward one another as the legs are propelled therealong by the driving means.

8. In an apparatus for forming and attaching bail shaped wire members, the combination of a pair of spaced stationary lugs, bending devices operable to bend a length of wire into bail shape with laterally spaced legs straddling the lugs, wire holders and bending means between the lugs and cooperable to bend the ends of the bail legs at an angle to the legs, and driving means operable to expel the wire bail from the lugs and engage the angular ends of the legs with the work, said wire holders being in the path of movement of the bail legs and progressively withdrawn therefrom as the bail is expelled from the lugs.

9. In an apparatus for forming and attaching bail shaped wire members, the combination of a support having a pair of clinchers, a housing having a pair of spaced projecting lugs, bending devices operable to bend a length of wire into bail shape with laterally spaced legs straddling the lugs, and wire bending and driving devices in the housing operable to remove the bail legs from the lugs and propel the ends thereof against the clinchers of the support.

10. In an apparatus for forming and attaching bail shaped wire members to a basket rim, the combination of a rim support having a pair of floating clinchers movable bodily to and from the work position and pivotally operable in any position of floating movement, means for forming a length of wire into bail shape with laterally spaced legs having angular attaching portions at the ends, driving mechanism for propelling the said angular attaching portions endwise through the rim on the support and against the floating clinchers, and means operable to positively rock the floating clinchers simultaneously in timed relation with the operation of the driving mechanism.

11. In an apparatus for forming and attaching bail shaped wire members, the combination of forming devices operable to bend a length of wire into bail shape with a pair of spaced legs each having an attaching portion at the end, driving means having spaced parts for punching the respective attaching portions of the bail through the work, and supporting means against which the work is held as said attaching portions are punched therethrough and said supporting means having spaced parts which cooperate respectively with the corresponding part of the driving means to clinch the ends of said attaching portions against the work, each of said parts of one of said means being automatically adjustable to and from the corresponding part of the other means to accommodate work of different thickness between the driving and supporting means and to accommodate difference in thickness of the work at the spaced places where the attaching portions of the bail are punched therethrough.

12. In an apparatus for forming and attaching bail shaped wire members, the combination of a work support, means for forming a length of wire into bail shape and driving the ends thereof at spaced places through the work on the support, said support being provided with separate clinching means against which the wire ends are driven and by which said ends are clinched against the adjacent face of the work, said separate clinching means being automatically and differentially adjustable according to the thickness of the work thereon so that difference in thickness of the work at the spaced places where the wire ends are driven therethrough is accommodated by relative adjustment of the clinchers and the spaced places where the wire ends start through the work are presented in an equalized manner to the driving means.

13. In an apparatus for forming and attaching bail shaped wire members to a basket rim, the combination of a work support, means for forming a length of wire into bail shape and driving the ends thereof at spaced places through the basket rim on the support, said support being provided with separate clinching means against which the wire ends are driven and by which said ends are deflected across the basket rim edge and projected beyond the opposite side of the rim, and means for bending the projecting ends against said opposite side of the basket rim, said latter means and said clinching means being automatically adjustable relatively according to and in a manner to compensate for variations in thickness of the basket rim therebetween.

14. In an apparatus for forming and attaching bail shaped wire members to a basket rim, the combination of a work support, means for forming a length of wire into bail shape and driving the ends thereof at spaced places through the basket rim on the support, said support being provided with separate clinching means against which the wire ends are driven and by which said ends are deflected across the basket rim edge and projected beyond the opposite side of the rim, and bending means operable to bend the projecting ends against said opposite side of the basket rim, said clinching means being resiliently held in the rim engaging position and individually retractable from said bending means to accommodate varying thickness of basket rim therebetween at the spaced places where the ends of the bail are driven therethrough.

15. In an apparatus for forming and attaching bail shaped wire members to a basket rim, the combination of a work support, means for forming a length of wire into bail shape with laterally spaced legs having angular attaching portions at the ends, driving means operable to propel the said angular attaching portions lengthwise through a basket rim on the work support, bending means adapted to be projected outwardly over the basket rim on the support, said support being provided with separate clinching means against which the ends of the attaching portions of the bail are engaged and by which they are deflected across the edge of the basket rim and into the path of said bending means, each clinching means being independently and automatically adjustable to accommodate varying thickness of rim between the support and bending means.

16. In an apparatus for forming and attaching bail shaped wire members, the combination of a reciprocating bending device, means for feeding a wire across the path of the bending device, a guide in the path of the bending device for directing the wire to the bending position, said guide being displaceable from the path of the bending device in the bending movement thereof.

ALBERT H. SCHMIDTKE.